May 15, 1951 T. A. KESTELL 2,552,793
MACHINE FOR SHAPING UPPERS OVER LASTS
Filed Nov. 20, 1947 9 Sheets-Sheet 1

Inventor
Thomas A. Kestell
By his Attorney

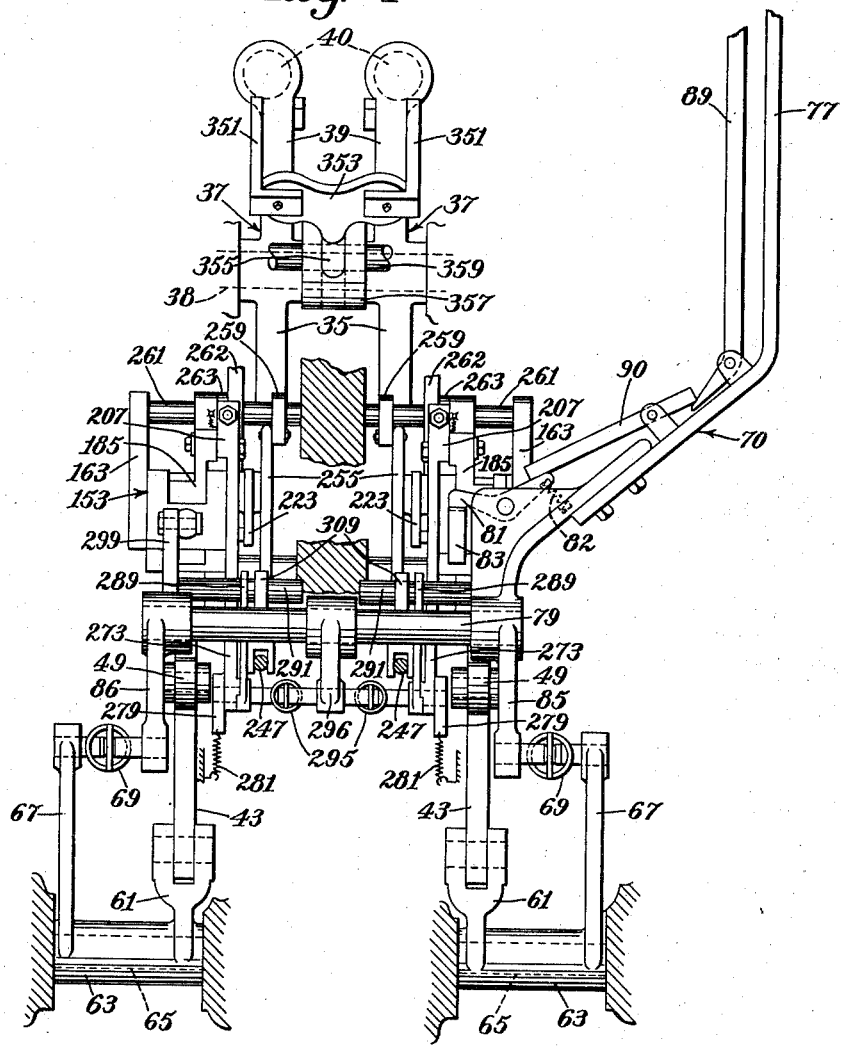

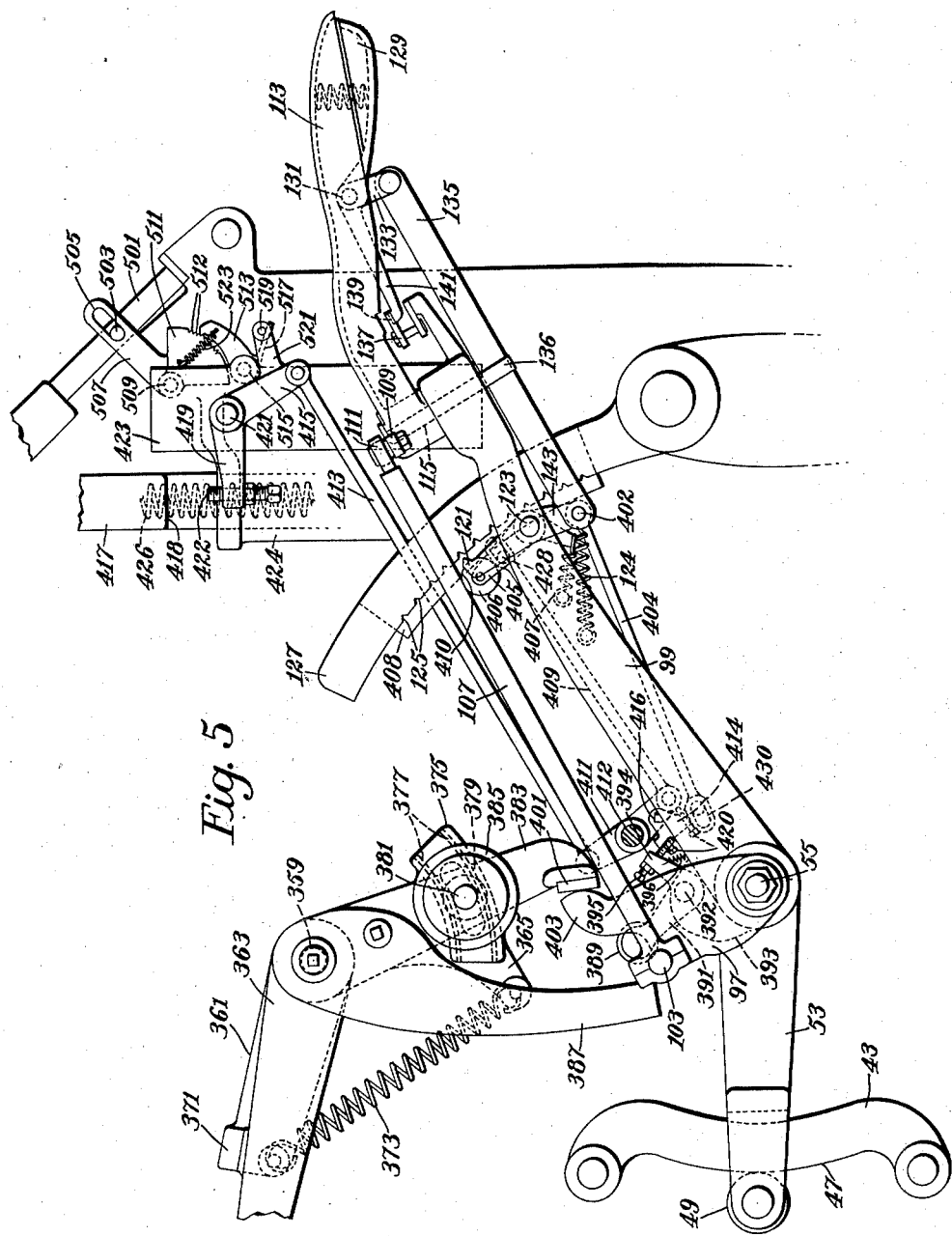

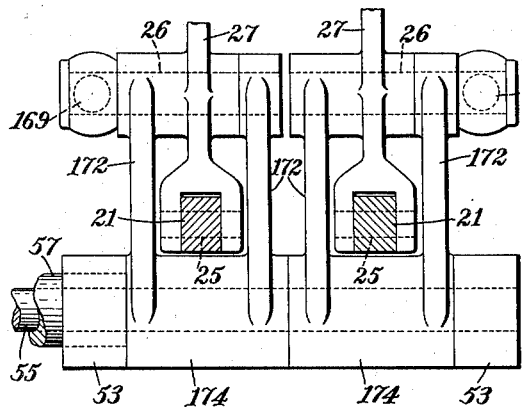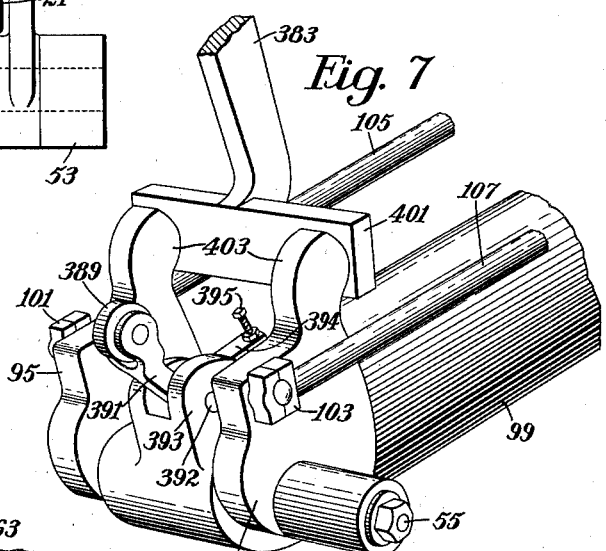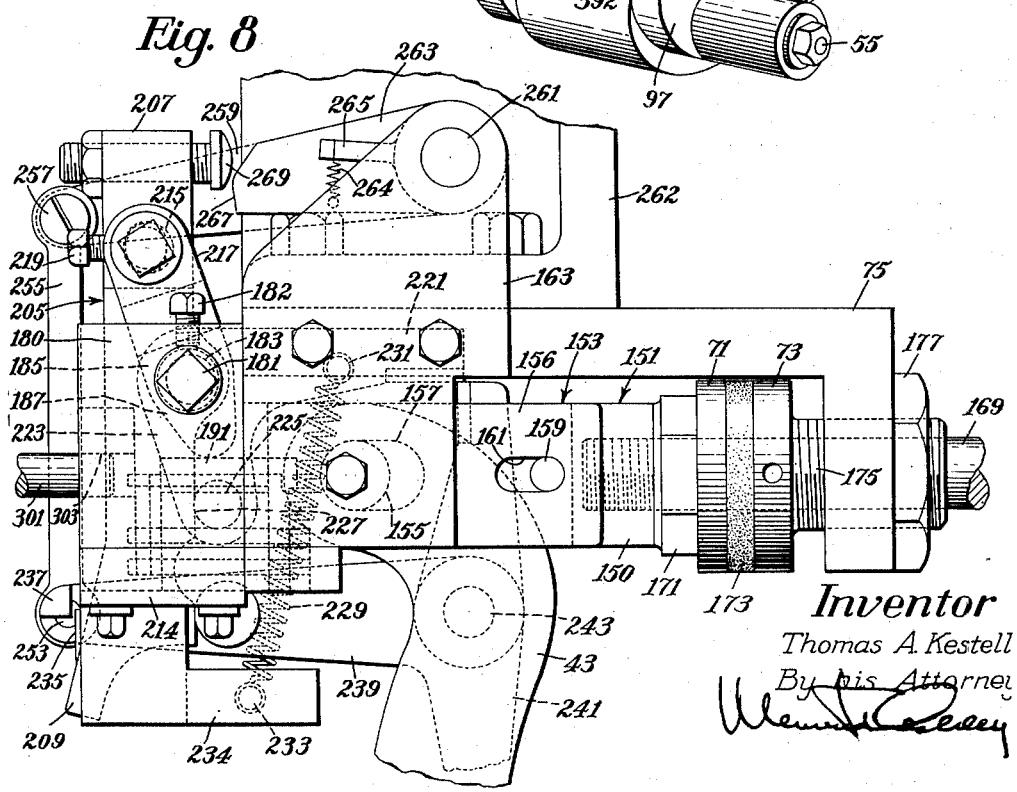

Inventor
Thomas A. Kestell
By his Attorney

May 15, 1951 T. A. KESTELL 2,552,793
MACHINE FOR SHAPING UPPERS OVER LASTS
Filed Nov. 20, 1947 9 Sheets-Sheet 8

Inventor
Thomas A. Kestell
By his Attorney

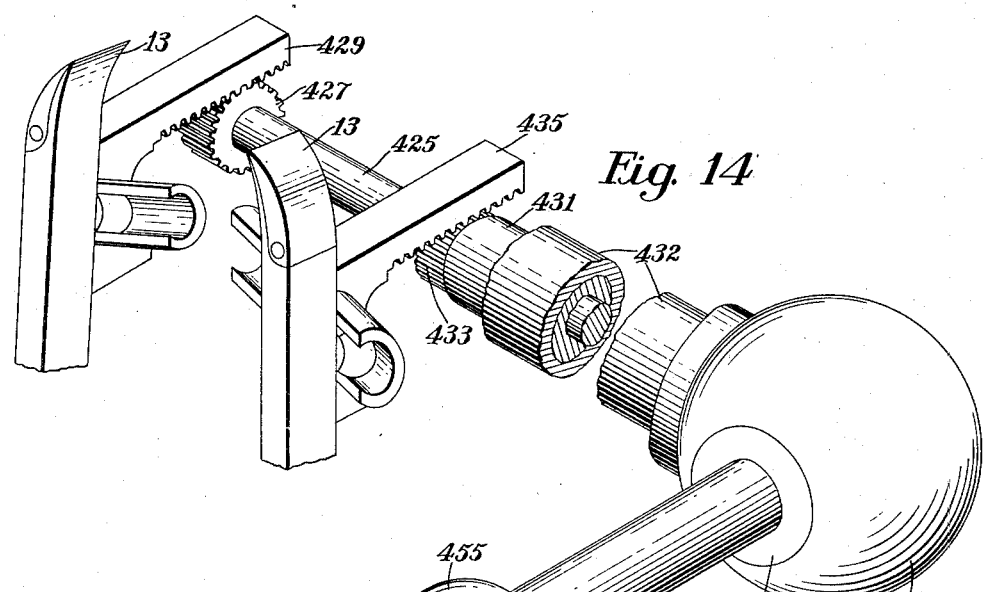
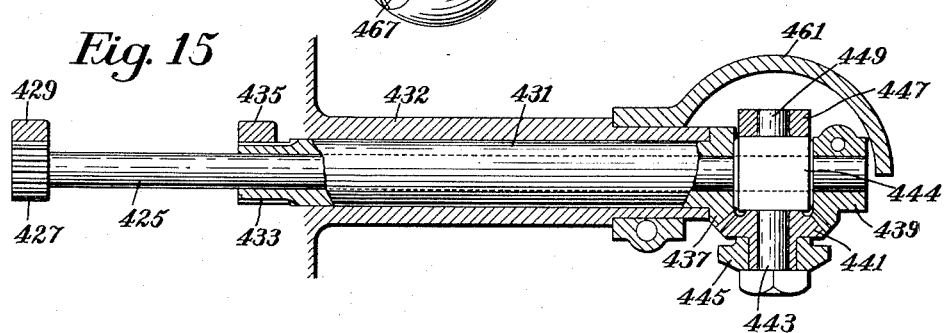
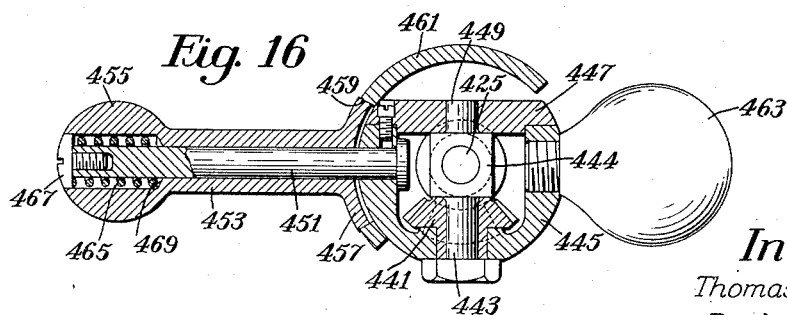
Inventor
Thomas A. Kestell
By his Attorney

UNITED STATES PATENT OFFICE 2,552,793

MACHINE FOR SHAPING UPPERS OVER LASTS

Thomas Aubrey Kestell, Leicester, England, assignor to United Shoe Machinery Corporation, Flemington, N. J., a corporation of New Jersey Application November 20, 1947, Serial No. 787,157
In Great Britain December 16, 1946

53 Claims. (Cl. 12—10.4)

This invention relates to machines for use in the manufacture of shoes for shaping uppers over lasts, and is herein shown as embodied in a modification of a power-operated pulling-over machine of a well-known type exemplified by the disclosure of United States Letters Patent No. 1,962,260, granted on June 12, 1934 on an application of W. T. B. Roberts, various details of construction of machines of this type being more fully disclosed in other United States letters patent including those hereinafter mentioned. It is to be understood, however, that the invention is not limited to machines of that particular type.

A machine of the above-mentioned type includes in its organization grippers which grip the margin of an upper respectively at the opposite sides of the forepart of a last and pull the upper heightwise of the last. The grippers are connected to so-called updraw levers which are movable thus to pull the upper, the levers being operated through "updraw" springs which are yieldable in the upper-pulling operation and hold the upper under tension after the pull has been applied. While the upper is thus held under tension the machine comes automatically to a stop to permit inspection of the work. As a result of such inspection it may be desired either to increase or to decrease the force of the pull of the side grippers on the upper. To increase the force of the pull the operator must move the updraw levers farther manually in the direction of their pull on the upper and to decrease the force of the pull he must move them in the opposite direction against the resistance of the updraw springs. It may be desired also to shift the forepart of the upper widthwise of the last, in which case the operator must move one updraw lever in the direction to increase the force of the pull and the other lever in the opposite direction.

One object of the present invention is to provide a construction enabling the operator more conveniently and easily to control the side grippers for the purposes above described. The construction herein shown comprises means whereby the force of the pull of these grippers on the upper may be increased or decreased while the upper is held under tension by increasing or decreasing the mechanical advantage of levers which are connected respectively to the different grippers and are movable in the pulling of the upper. In the illustrative embodiment of the invention these levers are not what are commonly known as the updraw levers in machines of this type, but are additional levers connected to the updraw levers and themselves directly under the influence of the updraw springs. In this embodiment of the invention, moreover, the mechanical advantage of the additional levers is varied by moving their fulcrums lengthwise of the levers, the fulcrums being carried by arms which are mounted for swinging movements and the levers being curved to facilitate such movements of the arms. By such movements of the fulcrums, therefore, the effectiveness of the updraw springs may be varied to vary correspondingly the force of the pull on the upper, thus increasing or decreasing as desired the force of the pull of both side grippers or increasing the force of the pull at either side and decreasing that at the other side.

Further to facilitate control of the side grippers, the invention, in its illustrative embodiment, provides a construction such that by manipulation of the same member the operator may produce any of the results above described or all of them. As herein shown, this member consists of a hand lever which is pivotally mounted on another lever to swing toward the right or the left, the two levers being movable as a unit in a downward direction by force applied to the hand lever to increase as described the force of the pull of both side grippers on the upper and in an upward direction to decrease the force of the pull of both grippers. Movement of the hand lever toward the right or the left serves to increase the force of the pull of one side gripper and simultaneously to decrease the force of the pull of the other side gripper to adjust the upper widthwise of the last. In order further to facilitate such adjustment of the upper, there is provided means also operated by the above-mentioned hand lever for moving both side grippers against the resistance of their updraw springs to relieve the force of their pull on the upper, after which the hand lever may be moved to adjust the upper as described by increasing the effectiveness of one spring and decreasing the effectiveness of the other. Mechanism also is provided for automatically returning the hand lever and the fulcrums which it controls to predetermined normal positions near the end of the cycle of operations of the machine.

While the levers associated with the shiftable fulcrums are curved as hereinabove described to facilitate movement of the fulcrums along the levers by the swinging arms which carry them, it will be evident that if these levers should swing substantial distances in the upper-pulling operation the operator could not so easily shift the fulcrums. The invention, accordingly, further provides a construction such that these levers receive only very short movements which are, moreover, substantially the same regardless of differences in the yieldability of different uppers, so that the amount of effort required for the operator to shift the fulcrums of the levers does not vary substantially in operating on work of different kinds. An additional advantage of this construction is that for any given adjustment of the updraw springs the force of the pull applied in operating on different uppers is substantially uniform, since the springs are subjected to substantially the same amount of tension by the movements of the levers in operating on the different uppers. For the purpose in view, the previously mentioned connection between each of these levers and the corresponding updraw lever includes a pair of members normally locked together and movable one by the other to swing the lever having the shiftable fulcrum against resistance of the updraw spring connected to it, and mechanism is provided for momentarily unlocking these members a plurality of times in the course of the upper-pulling operation to permit relative movements thereof and thus to minimize the amount of movement imparted to the last-mentioned lever. The construction is further such that the members are invariably locked together in the final portion of the upper-pulling operation, thus insuring that the grippers will be under the influence of the updraw springs when the pull is completed.

After the machine has come to a stop with the upper held under tension by the grippers, it is usually necessary for the operator also to move the side grippers lengthwise of the last to position the tip line of the upper at the proper distance from the toe-end face of the last and in proper angular relation to the last. The invention further provides simple means of novel construction for conveniently and easily accomplishing this result. As illustrated, a hand lever is connected by differential gearing to both side grippers in such manner that by movements of the hand lever in various directions movements correspondingly varying in character may be imparted to the grippers. More particularly, the side grippers may be moved together equal distances toward or from the end of the toe by appropriate movements of the hand lever, and may be moved simultaneously equal distances in opposite directions lengthwise of the last by other movements of the hand lever. By still other movements of the hand lever either side gripper may be moved toward or from the end of the toe while the other is held stationary, or both grippers may be moved simultaneously unequal distances in the same direction or in opposite directions.

The above and other features of the invention, including various novel details of construction and combinations of parts, will now be more particularly described with reference to the accompanying drawings and thereafter pointed out in the claims.

In the drawings:

Fig. 4 is a view in rear elevation, with parts broken away, of the mechanism shown in Fig. 3 and of similar mechanism associated with the right-hand side gripper;

Fig. 5 is a view in left-hand side elevation of mechanism provided for varying the force of the pull applied by the side grippers to the upper and of parts associated therewith;

Fig. 6 is a view mainly in front elevation of a portion of the structure shown in Fig. 3;

Fig. 7 is a perspective view of a portion of the structure shown in Fig. 5;

Fig. 8 is a view in left-hand side elevation, on an enlarged scale, of a portion of the mechanism shown in Fig. 3;

Fig. 14 is a perspective view, with parts broken away, showing means provided for adjusting the side grippers in directions lengthwise of the last;

Fig. 15 is a sectional view of the mechanism shown in Fig. 14, in a vertical plane extending widthwise of the machine; and Fig. 16 is a sectional view of a portion of the same mechanism in a vertical plane extending forwardly and rearwardly of the machine.

Figure 1:
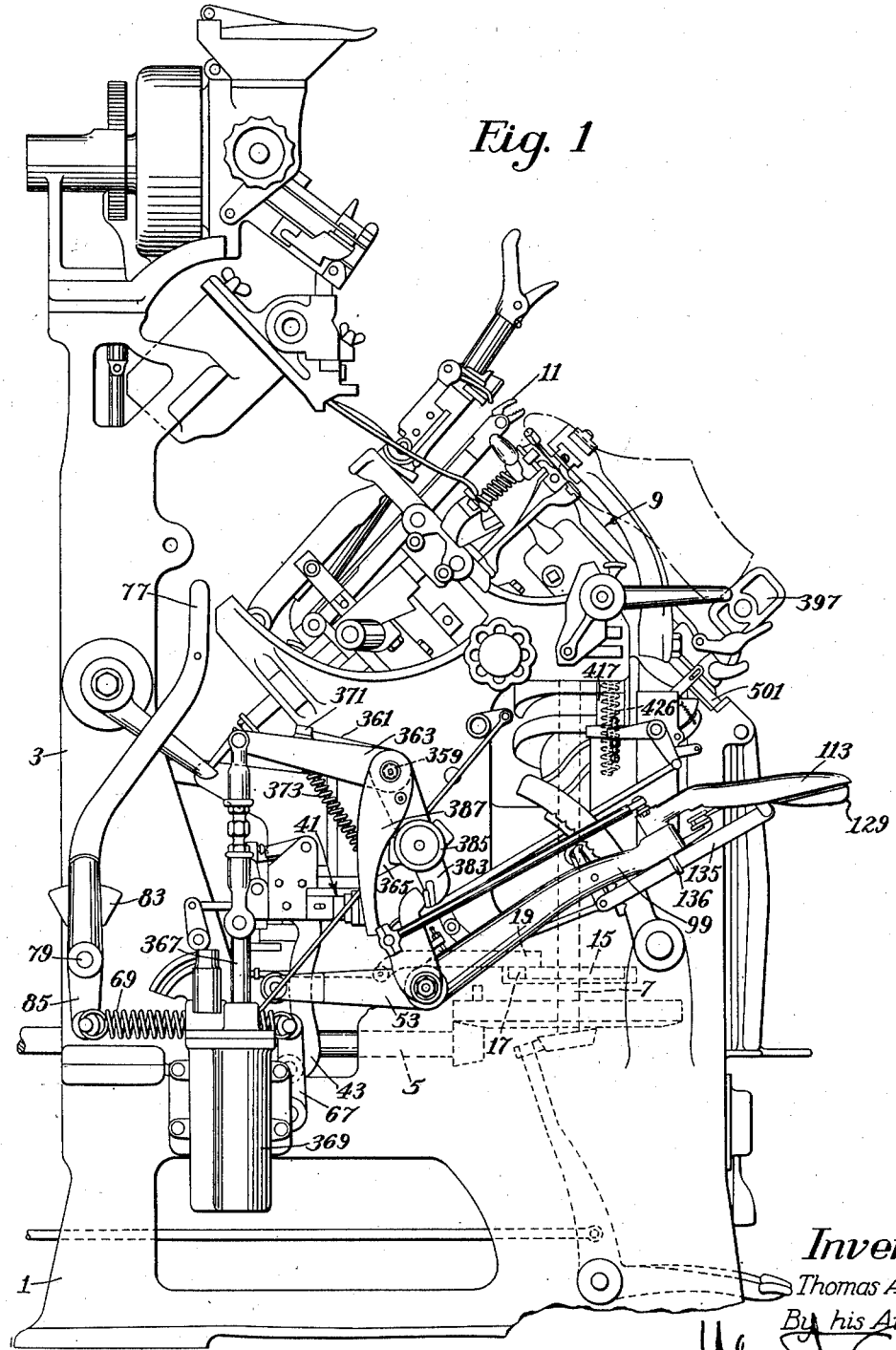
Fig. 1 is a view in left-hand side elevation of the machine in which the invention is herein shown as embodied.

Like the machine shown in the previously mentioned Letters Patent No. 1,962,260, the machine herein shown has a frame which includes a base 1 and a rear column 3. Journaled in bearings in the frame is a power shaft 5 extending forwardly and rearwardly of the machine. As disclosed in said Letters Patent this shaft is driven through a clutch (not shown) upon depression of a treadle 6. The shaft 5 is connected by gearing to a vertical cam shaft 7 provided with a plurality of cams for operating different mechanisms included in the machine. The shoe is supported bottom downward in an inclined position, as illustrated diagrammatically in Fig. 1, on a shoe rest identified generally by the reference character 9. Among the instrumentalities operated by cams on the cam shaft 7 is a toe gripper 11 (Fig. 1) which grips and pulls the upper at the end of the toe and a pair of side grippers 13 (Fig. 14) which grip and pull it at the sides of the forepart. The side grippers, the construction of which is shown conventionally in Fig. 14, may each consist of a single pair of gripper jaws or, as common heretofore in machines of this type, of two pairs of jaws spaced somewhat apart lengthwise of the shoe. The several grippers grip and pull the upper in the first stage of a cycle of operations of the machine, after which the machine comes automatically to a stop with the upper held under tension to permit the operator to inspect the work and, if necessary, to vary the force of the pull applied to the upper or to adjust the position of the throat opening or the tip line relatively to the last. Thereafter the operator again depresses the treadle 6 to initiate the second stage of the cycle of operations during which the margin of the upper is wiped inwardly over the insole and tacks are driven to fasten it in pulled-over position, the grippers releasing the upper and moving away from the shoe heightwise thereof. Near the end of the second stage of the cycle also the parts are returned to starting positions and the shoe is released.

Figure 3:
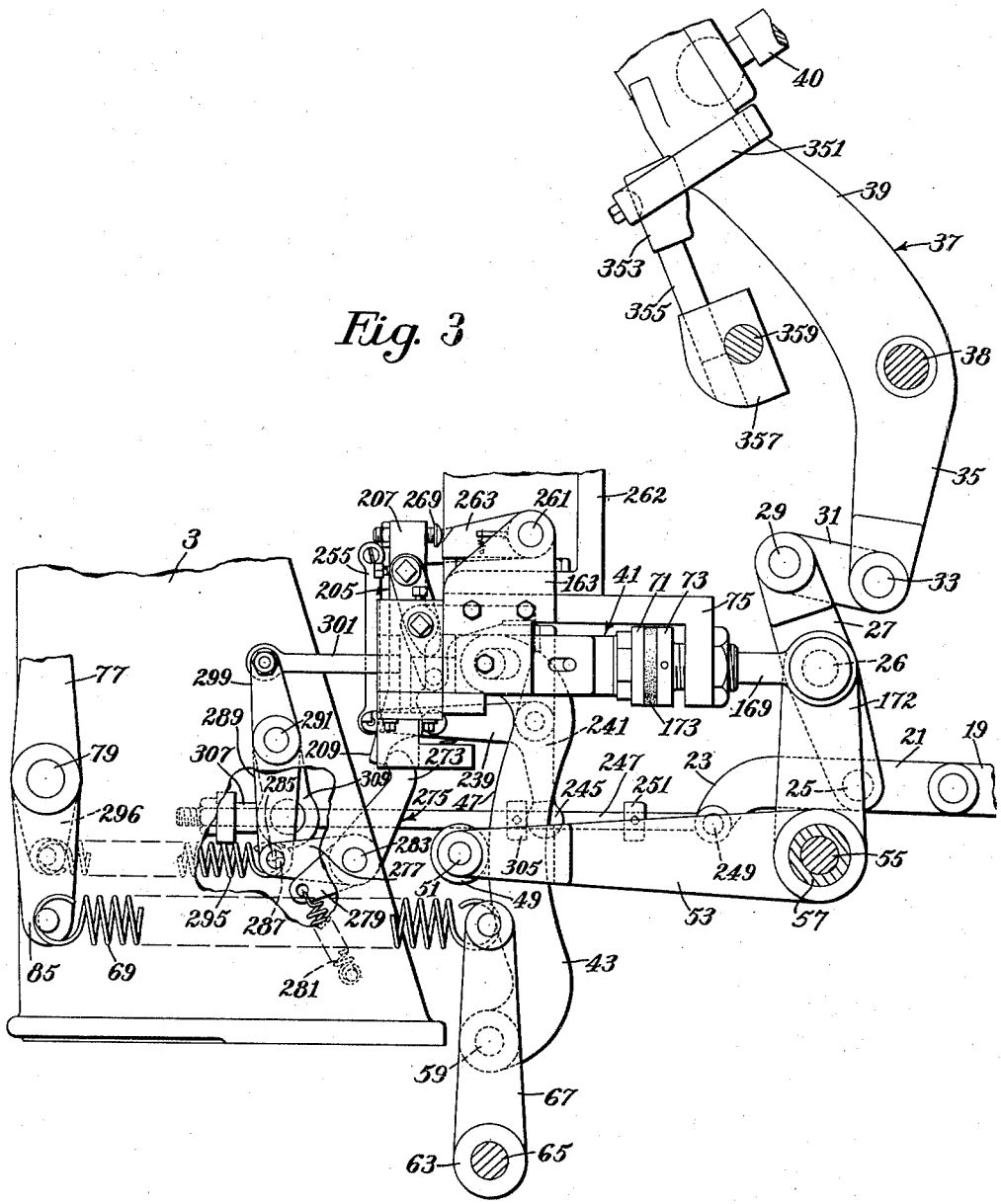
Fig. 3 is a view in left-hand side elevation, with parts broken away, showing mechanism provided for operating and controlling the left-hand side gripper.

For operating the toe gripper the machine is provided with means of substantially the same construction as heretofore, which need not be described in detail. For operating the side grippers it is provided with a cam 15 (Fig. 1) fast on the cam shaft 7 and engaging a cam roll 17 mounted on a cam slide 19 movable horizontally on the frame in forward and rearward directions. For purposes of this invention there are pivotally connected to the rear portion of this cam slide two rearwardly extending links 21 (Figs. 3 and 6) spaced apart widthwise of the machine, these links having downwardly curved rear end portions 23. In locations approximately midway between their front and rear ends the links 21 are connected by pivot pins 25 to the lower ends of upwardly and downwardly extending levers 27. These levers are pivotally connected at their upper ends by pins 29, one of which is shown in Fig. 3, to short links 31 the front ends of which are pivotally connected by pins 33 to downwardly extending arms 35 (Figs. 3 and 4) of levers 37 mounted to swing about a fixed shaft 38. The levers 37 correspond to the levers 17 of Letters Patent No. 1,962,260 and are what are commonly termed side gripper updraw levers. They have upwardly and rearwardly extending arms 39 connected respectively to gripper bars 40 of the opposite side grippers 13.

By means of a pin 26 each lever 27 is pivotally connected in a location substantially midway between its upper and lower ends to a rearwardly extending coupling device 41, hereinafter described in detail, each coupling device being pivotally connected to the upper end portion of a curved lever 43 extending generally heightwise of the machine. Each lever 43 has a rear edge face 47 curved in the arc of a circle about a horizontal axis extending widthwise of the machine in front of the lever. In engagement with the curved face 47 is a roll 49 pivotally mounted on a pin 51 between the two ears of a bifurcated rear end portion of a forwardly extending arm 53, the lever extending freely downward between the ears in front of the roll 49. That one of the arms 53 which is associated with the mechanism for operating the right-hand side gripper (as viewed from the front of the machine) is secured at its front end (Fig. 6) to the right-hand end of a shaft 55 extending widthwise of the machine and journaled in suitable bearings in the frame. The other arm 53, associated with the mechanism for operating the left-hand side gripper, is fast on the right-hand end of a sleeve 57 coaxial with the shaft 55 and freely rotatable thereon. The common axis of the sleeve 57 and the shaft 55 coincides approximately with the axis of the arcuate rear faces 47 of the levers 43 when the parts are positioned as they are prior to the beginning of the cycle of operations of the machine. By imparting swinging movements to the arms 53 about this common axis the rolls 49 may be moved along the curved faces 47 for a purpose hereinafter explained, and as will also be more fully understood hereinafter, the rolls 49 serve as fulcrums for the levers 43 in operating the side grippers.

The levers 43 are pivotally connected at their lower ends by pins 59 (Fig. 4) to arms 61 extending upwardly from sleeves 63 which are freely rotatable on shafts 65 on the frame. Each sleeve 63 has another arm 67 extending upwardly therefrom in parallel relation to the arm 61, the arms 67 in the construction shown being substantially twice as long as the arms 61. The upper ends of the arms 67 are connected to the front ends of rearwardly extending tension springs 69 of substantial strength which perform the functions of what are commonly termed updraw springs for the side grippers. The rear ends of the springs 69 are connected to mechanism mounted on the frame for varying their tension. This mechanism, identified generally by the reference character 70, includes a hand lever 77 secured to a shaft 79 extending widthwise of the machine and journaled in the frame. This hand lever is held in adjusted position by means of a latch member 81 pivotally mounted thereon and held normally by a spring 82 in engagement with teeth formed on an arcuate member 83 on the frame. The hand lever has a downwardly extending arm 85 the lower end of which is connected to the rear end of the spring 69 controlling the left-hand side gripper. The rear end of the spring 69 which controls the right-hand side gripper is connected to a depending arm 86 secured to the shaft 79. The latch member 81 is controlled by a release lever 89 pivotally mounted on the lever 77 and arranged to act on the latch member through a lever 90 also pivotally mounted on the lever 77. The upper portion of the lever 77 is curved forwardly to a position convenient for use by the operator to adjust as desired the tension of the springs 69 and thereby to vary the force with which the side grippers will pull an upper.

From the foregoing description it will be evident that the springs 69 tend to swing the levers 43 in clockwise directions with reference to Fig. 3 about the fulcrum rolls 49 and thus to move the coupling devices 41 in forward directions. As more fully hereinafter described, forward movements of these coupling devices, which connect the upper ends of the levers 43 to the intermediate portions of the levers 27, are positively limited to determine the initial positions of the pins 26 connecting these devices to the levers 27. That is, the coupling devices include members 71 the forward movements of which are limited by stops 73 adjustably secured in fixed brackets 75 which serve as supports for the coupling devices. Accordingly, rearward movement of the cam slide 19 in the first stage of the cycle of operations first causes the levers 27 to swing in clockwise directions about the pins 26 as fulcrums and thereby to swing the updraw levers 37 to close the side grippers on the upper and to begin the pulling of the upper. When the force thus applied in pulling the upper becomes great enough to overcome the tension of the springs 69, the levers 27 swing about the pins 29 as fulcrums and move the coupling devices 41 in rearward directions, thus swinging the levers 43 in counterclockwise directions with reference to Fig. 3 about the rolls 49 against the resistance of the springs 69. The amount of force applied to the upper, therefore, depends both upon the adjustment of the springs 69, as determined by the position of the adjusting lever 77, and upon the positions of the fulcrum rolls 49 lengthwise of the levers 43.

After the machine has come to a stop at the end of the first stage of the cycle, the force of the pull of each side gripper on the upper may be increased or decreased by movement of the corresponding fulcrum roll 49 lengthwise of the lever 43 to alter the mechanical advantage of the lever. For this purpose the sleeve 57 has fast thereon a short lever 95 (Fig. 7) extending radially of the sleeve, and the shaft 55 has a similar lever 97 secured on its left-hand end portion, this portion of the shaft extending somewhat beyond the left-hand end of the sleeve. Between the levers 95 and 97 a forwardly and upwardly extending lever 99 (Fig. 5) is pivotally mounted on the left-hand end portion of the sleeve 57. The levers 95 and 97 are connected at their upper ends by ball-and-socket joints 101, 103 to the rear end portions of rods 105 and 107 respectively, these rods extending forwardly and upwardly along the lever 99 and being connected at their front ends by ball-and-socket joints 111 to the opposite end portions of a crossbar 109. A short hand lever 113 is mounted for lateral swinging movements about a stud 115 secured in the front end portion of the lever 99, this stud extending at right angles to the axis of the shaft 55. The crossbar 109 is rigidly connected to the hand lever 113 near the stud 115, so that swinging movement of this hand lever toward the right about the stud moves the rods 105 and 107 in opposite directions respectively to turn the shaft 55 and the sleeve 57 in opposite directions, thereby moving the fulcrum roll 49 associated with the right-hand side gripper upwardly along the corresponding lever 43 and moving the roll associated with the left-hand side gripper downwardly along the other lever 43. In this manner the positions of the two fulcrum rolls are so changed as to increase the force of the pull applied to the upper by the right-hand side gripper and to decrease the force of the pull applied by the left-hand side gripper. Correspondingly, swinging movement of the hand lever 113 toward the left will decrease the force of the pull of the right-hand side gripper and increase the force of the pull of the left-hand side gripper.

If the hand lever 113 is held in a central position and is moved bodily upward to cause the lever 99 to be swung upwardly about the axis of the shaft 55, both this shaft and the sleeve 57 thereon will be turned equal distances in the same direction by the action of the rods 105 and 107 on the levers 95 and 97. In this manner both rolls 49 will be moved downwardly along the curved surfaces of the levers 43, thus decreasing equally the forces applied by both side grippers to the upper. Correspondingly, movement of the lever 99 in a downward direction will be accompanied by upward movements of the rolls 49 along the levers 43 to increase equally the forces applied by both side grippers to the upper.

The lever 99 may be retained in any desired adjusted position by a latching device comprising a pawl 121 pivotally mounted on a stud 123 on the lever and controlled by a spring 124 which tends to hold it in one or another of a series of V-shaped depressions 125 formed in an arcuate member 127 fast on the frame adjacent to one side of the lever 99, the center of curvature of this arcuate member being coincident with the axis of the shaft 55. The pawl 121 may be swung away from the arcuate member 127 by movement of a hand grip member 129 pivotally mounted on a pin 131 on the hand lever 113. This member has an arm 133 pivotally connected to the front end of a resiliently flexible strip 135 the rear end of which is pivotally connected to a tail portion 143 of the pawl 121. About midway of its length the strip 135 lies between two controlling members 136 extending downwardly from the front end of the lever 99 for engagement with the strip. The strip 135 is flexible in directions widthwise of the machine and thus permits the lever 113 to be swung laterally about the stud 115 while maintaining a connection between the hand grip member 129 and the pawl 121. To maintain the lever 113 normally in a central position with respect to movement about the stud 115, there is secured to the front end of the lever 99 an arcuate member 137 the center of curvature of which is coincident with the axis of the stud 115. This arcuate member has therein a notch 139 into which is arranged to extend a latch 141 formed as a third arm of the hand grip member 129. By the movement of the hand grip member the latch 141 is withdrawn from the notch 139 simultaneously with withdrawal of the pawl 121 from the arcuate member 127.

From the foregoing description it will be understood that after the machine has come to a stop at the end of the first stage of the cycle with the upper held under tension, the operator may, if necessary, (a) increase equally the force of the pull of both side grippers on the upper by moving the levers 113 and 99 downwardly as a unit about the axis of the shaft 55; (b) decrease equally the force applied by the side grippers to the upper by moving these levers upwardly as a unit; (c) increase the force applied by one side gripper to the upper and decrease the force applied by the other side gripper by swinging the hand lever 113 to the right or the left about the stud 115 without disturbing the lever 99; or (d) by a combination of movement c with movement a or b increase or decrease the force applied by one side gripper to the upper without substantially changing the force applied by the other side gripper.

Figure 10:
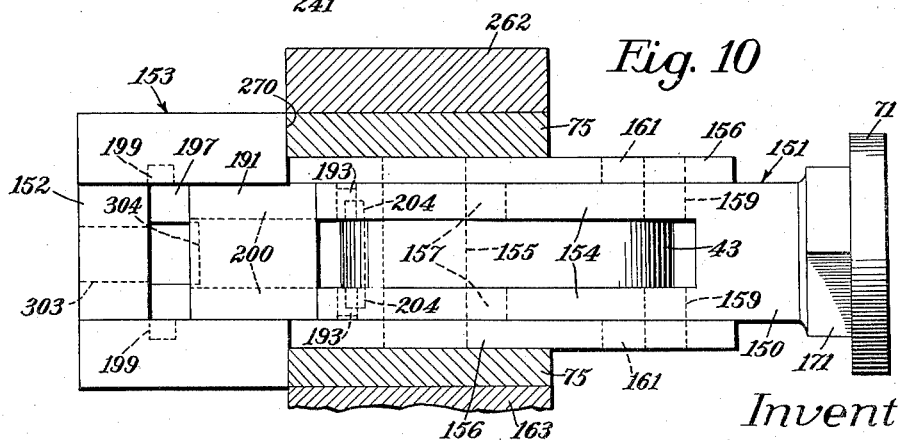
Fig. 10 is mainly a plan view of a portion of the mechanism shown in Fig. 8.

It will be evident that the amount of effort required for the operator to move the fulcrum rolls 49 upwardly along the levers 43 to increase the force of the pull on the upper while the upper is held under tension depends upon the positions assumed by the levers at the end of the first stage of the cycle. The coupling devices 41 connecting the intermediate portions of the levers 27 to the upper ends of the levers 43 have been thus far referred to as if each of them were, in effect, a single rigid member. If this were so, however, the positions assumed by the levers 43 in swinging about the fulcrum rolls would vary, in operating upon different uppers, in accordance with the yieldability of the uppers and their looseness on the lasts. There would, moreover, be no direct relation in all cases between the amount of effort required to move the rolls and the heaviness of the upper stock, and the operator might receive a false impression as to the effect of such movement. The construction shown is accordingly such that the effort necessary to effect any given movement of the rolls is substantially independent of the character of the work being operated upon. For this purpose each of the coupling devices 41 includes two parts which are normally locked together but during an early portion of the movement of the cam slide 19 are automatically unlocked and then locked again a plurality of times in rapid succession to permit movements of the pivot pins or fulcrums 26 for the levers 27 relatively to the levers 43 and thus to reduce the amount of movement imparted to the levers 43, the parts being always locked together during the final portion of the movement of the cam slide. The result, therefore, is that with the rolls 49 in the same positions initially in operating on different uppers, as they are intended to be, the amount of swinging movement imparted to the levers 43 in the upper-pulling operation is always substantially the same. For the purpose in view, each coupling device 41 includes an inner slide 151 (Fig. 10) and an outer slide 153, these being the two above-mentioned parts of the device. The inner slide 151 is substantially U-shaped in plan, its crossbar 150 being toward the front of the machine, and the outer slide 153 is also substantially U-shaped with its cross-bar 152 toward the rear of the machine. Plate-like side portions 154 of the inner slide are slidably mounted between similar side portions 156 of the outer slide. Mounted in the side portions 156 of the outer slide is a pin 155 which extends through slots 157 formed in the side portions 154 of the inner slide, this pin serving as the pivotal connection between the coupling device and the upper end of the lever 43 which lies between the side portions 154 of the inner slide. To assist in guiding the inner slide in moving relatively to the outer slide there are further provided pins 159 extending from the side portions of the inner slide into slots 161 formed in the side portions of the outer slide. The outer slide 153, moreover, is guided for forward and rearward movements by two downwardly extending plate-like portions of the previously mentioned bracket 75, to the outer side of which bracket is secured an upwardly extending plate 163. The crossbar 150 of the inner slide has threaded in it (Fig. 8) a forwardly extending stem 169 on which is a lock nut 171 engaging the front end of the crossbar, this lock nut being part of the previously mentioned member 71 which cooperates with the stop member 73 to limit forward movement of the inner slide. The stop member 73 has a sleeve-like portion 175 threaded in a depending portion of the bracket 75 and through which the stem 169 loosely extends, a lock nut 177 being threaded thereon to secure the stop member in different adjusted positions. Between the stop member 73 and the member 71 is a leather washer 173 to lessen the shock of impact. The stem 169 is controlled in its forward and rearward movements by parallel arms 172 (Fig. 6) extending upwardly from a sleeve 174 pivotally mounted on the shaft 55, the pin 26 being mounted in bores in these arms.

Figure 9:
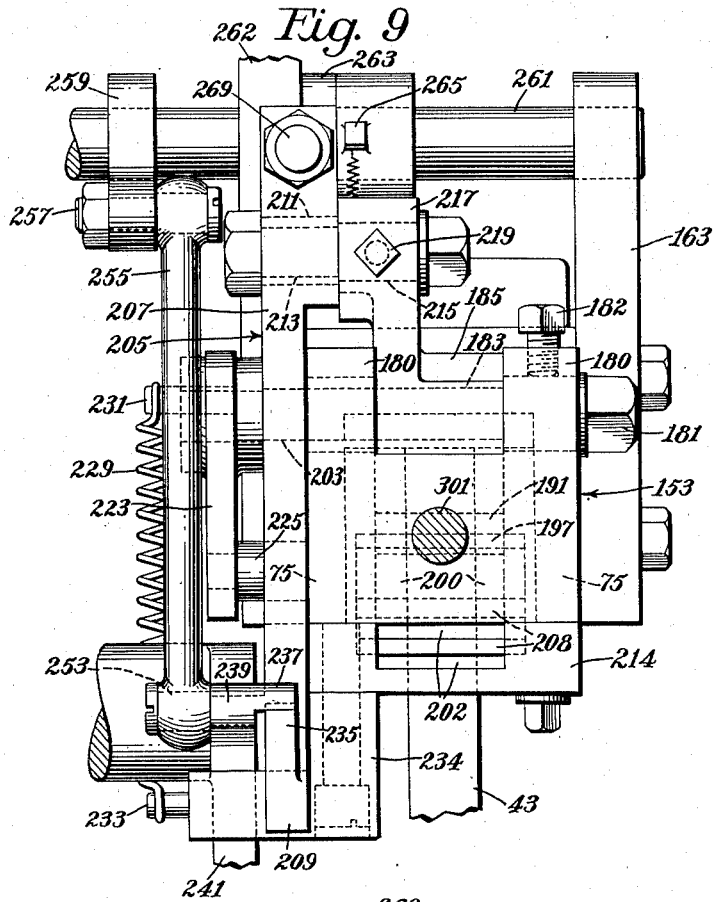
Fig. 9 is a view in rear elevation of the mechanism shown in Fig. 8.
Figure 11:
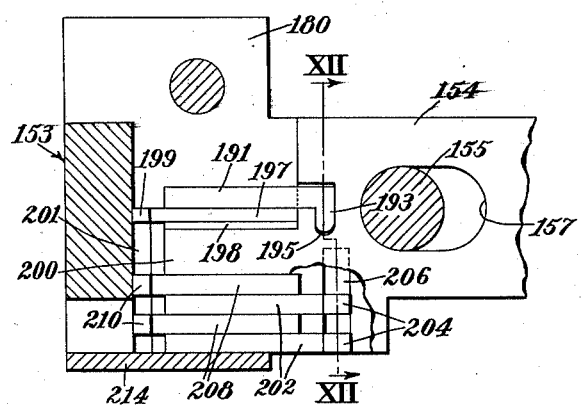
Fig. 11 is a view in left-hand side elevation of a portion of the structure shown in Fig. 10, with parts broken away.
Figure 12:
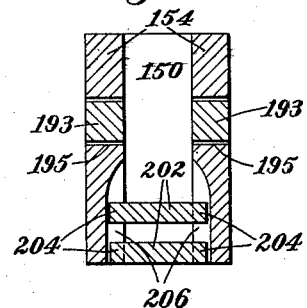
Fig. 12 is a section on the line XII—XII of Fig. 11 of a portion of the structure there shown.

Near the rear end of each outer slide 153 the side portions 156 thereof have upwardly extending ears 180 (Figs. 8, 9 and 11) in which is mounted a transverse pivot pin 181. This pin is provided between the ears 180 with an eccentric portion 183 on which is pivotally mounted a two-armed locking lever 185 having a downwardly extending arm 187 (Fig. 8) provided with a rounded end arranged to engage the upper substantially horizontal face of a small hardened plate 191. At its front end this plate is provided with depending lugs 193 (Figs. 11 and 12) mounted in recesses 195 in the side members 154 of the inner slide 151, sufficient clearance being provided to permit slight upward and downward movements of the plate. Positioned immediately below and supporting the plate 191 is a second hardened plate 197. This plate is connected to the outer slide 153 and for this purpose has outwardly extending square lugs 199 (Fig. 10) extending into vertical slots 201 formed in the side portions 156 of the outer slide. The lower face of the plate 197 overlies and engages the upper face of a hardened plate 198 secured to rearwardly extending portions 200 of the side members 154 of the inner slide. A second series of plates lies below the portions 200 of the inner slide and comprises plates 202 having lugs 204 extending into slots 206 in the side members 154 of that slide and plates 208 having lugs 210 extending into the slots 201 in the outer slide 153. The lower series of plates is supported by a member 214 secured to the side portions of the slide 153. The construction is accordingly such that when the lever 185 is swung, by mechanism hereinafter described, in a clockwise direction with reference to Fig. 8 about the eccentric portion 183 of the pin 181, the lower rounded end of its arm 187, by engagement with the upper face of the plate 191, causes the several plates by their frictional action to lock the two slides 151 and 153 together so that they will move as a unit. The corresponding updraw spring 69 thus becomes positively connected through the lever 43, the coupling device 41, the lever 27 and the link 21 to the cam slide 19. If, however, the lever 185 is momentarily swung in a counterclockwise direction in the upper-pulling operation, the slides 151 and 153 are unlocked to permit relative movement thereof. Accordingly such movement of the cam slide 19 as occurs at this moment will move the pivot pin 26 rearwardly without correspondingly moving the upper end of the lever 43. The height of the axis of the lever 185 may be adjusted to obtain the most effective locking action of the lever by turning the pin 181, and the pin may then be secured in adjusted position by a clamp screw 182.

Mounted to swing about a portion 203 (Fig. 9) of the pin 181 is a two-armed lever 205 comprising an upwardly extending arm 207 (see also Fig. 8) and a downwardly extending arm 209. The arm 207 has therein a slot 211 extending lengthwise of the arm, and into this slot extends a stud 213 which has an eccentric portion 215 mounted in an upwardly extending arm 217 of the two-armed lever 185. The levers 185 and 205 are thus connected together by the stud 213 to cause the lever 185 to be controlled by the lever 205, the slot 211 permitting such relative movement of the levers as results from the mounting of the lever 185 on the eccentric portion 183 of the pin 181. The levers may be relatively adjusted angularly by turning the stud 213 in its bearing in the arm 217, after which the stud may be secured in adjusted position by a clamp screw 219.

Also mounted to swing about the portion 203 of the pin 181 is a bell-crank lever having a forwardly extending arm 221 (Fig. 8) and a downwardly extending arm 223. The arm 223 at its lower end carries a pin 225 arranged to engage the front face 227 of the downwardly extending arm 209 of the lever 205. A spring 229 connects a pin 231 on the arm 221 to a pin 233 mounted in a depending portion 234 of the previously mentioned member 214 on the outer slide 153. The spring 229 accordingly tends to swing the arms 221 and 223 in a clockwise direction with reference to Fig. 8, and the arm 223, by reason of the engagement of its pin 225 with the arm 209 of the lever 205, tends to swing this lever and the connected locking lever 185 also in clockwise directions to lock the two slides 151 and 153 together in the manner previously described. This is the condition at the beginning of the cycle of operations. As the cam slide 19 is moved rearwardly, the side grippers are caused to close on the upper and then to begin to pull the upper, as hereinbefore explained, the fulcrum pins 26 for the levers 27 remaining stationary until the force applied in pulling the upper becomes great enough to overcome the tension of the updraw springs 69. Thereafter, as the cam slide continues its rearward movement, the pins 26 are moved rearwardly to swing the levers 43 against the resistance of the updraw springs, the two slides 151 and 153 of each coupling device 41 being locked together and therefore moving as one member. After the two slides have thus moved a predetermined short distance, an abutment 235 (Fig. 8) on the lower end of the arm 209 engages a stop 237 which in response to further slight rearward movement of the slides causes the lever 205 to swing in a counterclockwise direction with reference to Fig. 8 against the tension of the spring 229. This causes the arm 187 to relieve somewhat the pressure applied to the locking plates on the slides, whereupon the force of the updraw spring 69 serves to impart a slight forward movement to the outer slide 153 relatively to the inner slide 151. Since the outer slide carries with it the pivot pin 181 and the levers 185 and 205 mounted thereon, such slight forward movement thereof relieves the pressure of the stop 237 on the abutment 235, thus permitting the spring 229 again to lock the two slides firmly toegther. There will thus occur, on continued rearward movement of the cam slide 19, a series of rapidly repeated reductions and increases in the clamping force exerted on the friction plates by the arm 187. A virtual state of balance is thus established in which the inner slide 151 is permitted to move rearwardly in infinitesimal steps relatively to the outer slide 153, but in which sufficient friction is instantaneously applied after each step to cause the force of the pull applied to the upper to remain substantially constant without any substantial further swinging movement of the lever 43. This condition continues until the stop 237 is moved upwardly, by means which will be presently described, out of the path of the abutment 235 as the cam slide 19 nears the end of its rearward movement. The spring 229 then holds the slides 151 and 153 firmly locked together as the cam slide completes its movement, so that the corresponding side gripper at the end of the pull holds the upper under tension with a force determined by the adjustment of its updraw spring 69.

Each stop 237 which is engaged by the abutment 235 as above described is formed on the rear end of a rearwardly extending arm 239 (Figs. 8 and 9) which is one arm of a bell-crank lever having another downwardly extending arm 241, this lever being mounted for swinging movements about a pin 243 supported by a bracket on the frame. The stop 237 is positioned a short distance rearwardly of the abutment 235 on the arm 209 at the beginning of the cycle of operations. The arm 241 has a bifurcated lower end 245 (Fig. 3) between the forks of which extends a substantially horizontal rod 247 pivotally connected at its front end by a pin 249 to the corresponding link 21 connected to the cam slide 19. The rod 247, which is supported near its rear end for sliding movements by means not herein shown, is thus moved rearwardly by the cam slide, and after a predetermined amount of such movement a collar 251 adjustably secured on the rod engages the bifurcated lower end of the arm 241 and by further movement swings this arm rearwardly to raise the arm 239 and thereby to move the stop 237 out of the path of the abutment 235.

Pivotally connected by a stud 253 to the rear end of each arm 239 is the lower end of an upwardly extending link 255 which is pivotally connected at its upper end by a stud 257 to the rear end of a lever 259. The front end of this lever is fast on a shaft 261 mounted to turn in bearings formed in the previously mentioned plate 163 on the bracket 75 and in one wall of a casting 262 to which the bracket 75 is secured. Freely mounted on the shaft 261 is a rearwardly extending arm 263, and fast on the shaft is another rearwardly extending arm 265 connected to the arm 263 by a tension spring 264. When the lever 259, therefore, is swung upwardly by the link 255, an abutment face 267 on the rear end of the arm 263 is normally carried to a position in front of a stud 269 which is threaded in the upper end of the arm 207 of the lever 205. If, however, the machine is operated idly without any shoe therein, in which case no rearward movement of the outer slide 153 takes place and the stud 269 therefore lies in the path of upward movement of the arm 263, the spring 264 yields to permit the lever 259 to complete its upward movement.

When the arm 263 has been moved upwardly to carry its abutment face 267 to its normal position in front of the stud 269, as above described, it serves as a stop to effect the unlocking of the corresponding slides 151 and 153 from each other upon release of the upper by the grippers in the second stage of the cycle of operations. That is, by engagement with the stud it causes the lever 205 to swing in a counterclockwise direction with reference to Fig. 8 and thereby to relieve the clamping pressure on the previously described series of locking plates in response to forward movement of the outer slide 153 which carries the lever 205. It will be understood that such forward movement of the slide 153 is effected by the updraw spring 69 connected thereto immediately upon release of the upper by the grippers in the second stage of the cycle of operations, the slide being thus quickly returned to its initial position determined by engagement of shoulders 270 (Fig. 10) thereon with the rear edges of the previously mentioned downwardly extending portions of the corresponding bracket 75. The unlocking of the slides 151, 153 permits the inner slide 151 to be returned to the initial position determined by its stop 73, which is necessary in order fully to withdraw the corresponding gripper and thus to make way for the tacking mechanism.

To insure the prompt return of each inner slide 151 to the position determined by its stop 73, the lower end of the arm 209 (Fig. 3) of the lever 205 is arranged to engage the upper end of an upwardly extending arm 273 of a three-armed lever 275 and to swing this lever in a clockwise direction with reference to Fig. 3 as the lever 205 is swung in a counterclockwise direction by the arm 263 in the manner above described. The lever 275 is further provided with a rearwardly extending arm 277 and a third arm 279 connected by a tension spring 281 to the frame, this spring tending to swing the lever in a counterclockwise direction about a pivot stud 283 on the frame. The arm 277 at its rear end is provided with an abutment 285 the front face of which is arranged to engage the rear face of another abutment 287 formed on the lower end of a downwardly extending arm 289 fast on a shaft 291 which is mounted to turn in bearings in the column 3. A rearwardly extending tension spring 295 connected at its front end to the lower end of the arm 289 and at its rear end to an arm 296 fast on the previously mentioned shaft 79 tends to swing the arm 289 in a clockwise direction with reference to Fig. 3, such movement of the arm, however, being initially prevented by the engagement of the abutment 285 on the arm 277 with the abutment 287 on the lower end of the arm 289. Also fast on the shaft 291 is an upwardly extending arm 299 to the upper end of which is connected a forwardly extending pusher rod 301. This rod is loosely mounted in a bore 303 (Fig. 8) formed in the crossbar 152 of the outer slide 153, and when it is moved in a forward direction its front end is arranged to engage the rear edge of the plate 198 on the inner slide 151 and to move this slide forwardly to the position determined by the stop 73, the plate 197 having a recess 304 (Fig. 10) therein to clear the rod. Such movement of the rod 301 is effected by the spring 295 when the abutment 285 is moved upwardly to release the arm 289 as above described. In a later portion of the second stage of the cycle of operations, when the cam slide 19 is moved forwardly to return the grippers to their initial positions, a collar 305 on the rod 247 engages the rear face of the lower end 245 of the arm 241 to return this arm and the parts connected therewith to starting positions. This causes the arm 263 to swing downwardly, thus permitting the spring 229 again to lock the two slides 151 and 153 together. Also in response to the forward movement of the cam slide 19 a collar 307 on the rod 247 engages a depending arm 309 fast on the shaft 291 and swings the arm 299 in a counter-clockwise direction to return the rod 301 to its initial position while tensioning the spring 295. It will be understood that in proper time relation to these movements the abutment 285 is also returned by the spring 281 into position again to lock the lever 289 against movement by the spring 295.

Figure 13:
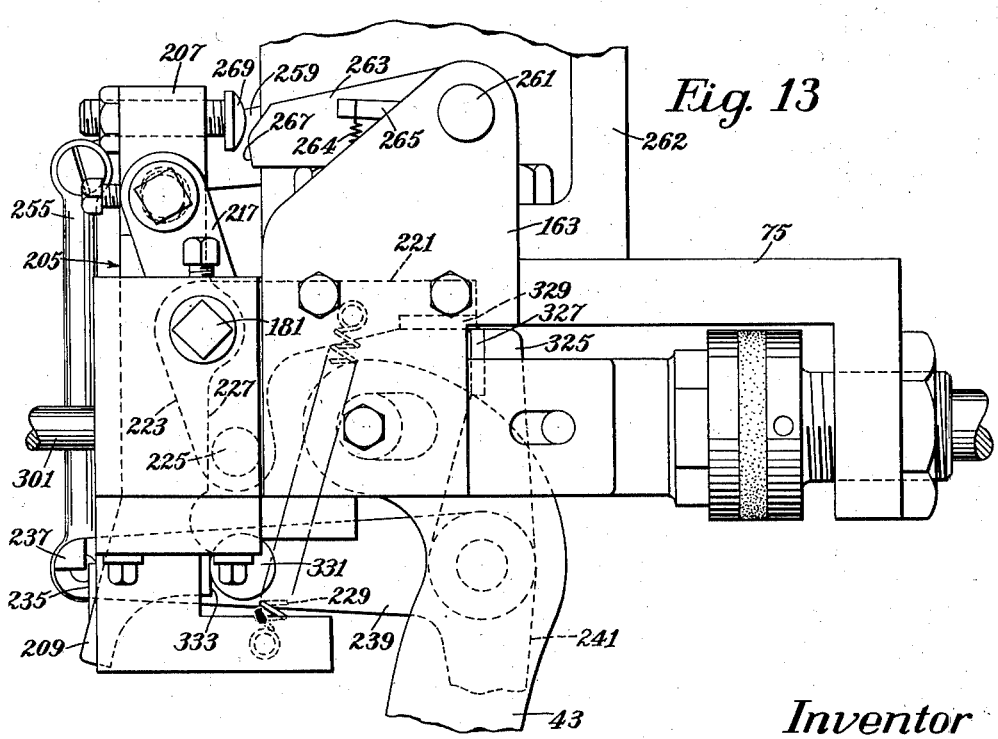
Fig. 13 is a view similar to Fig. 8 showing a modification.

It will be understood that, if the machine is to be suitable for use on heavy uppers, the springs 229 associated with the coupling devices 41 must be of considerable strength in order to hold the slides 151 and 153 of these devices locked together with sufficient force. It will be evident, however, that in unlocking the slides intermittently in the manner hereinbefore described the stops 237 must act in opposition to the springs 229 with a force transmitted through the coupling devices to the updraw levers 37, so that the upper is subjected at times not only to the force of the updraw springs 69 but also to additional force resulting from the tension of the springs 229. Accordingly, if the tension of the updraw springs 69 is reduced by means of the lever 77 to adapt the machine to operate on comparatively light uppers, the action of the springs 229 still may cause such uppers to be subjected to greater force than is desired. To avoid this, the modified construction shown in Fig. 13 may be used. In this construction the means for controlling each coupling device 41 includes, in addition to the parts previously described and shown in Fig. 8, an upwardly extending arm 325 formed integral with the bell-crank lever 239, 241. On this arm is a hardened plate 327 which at the beginning of the cycle of operations underlies and engages a hardened plate 329 mounted on the front end of the previously mentioned arm 221. In this manner the pin 225 on the arm 223 is held out of engagement with the front face 227 of the arm 209, and accordingly the spring 229 is prevented from acting on the lever 205. There is, however, further provided a pin 331 secured to the arm 239 and arranged to engage a front face 333 on the lower end of the arm 209 of the lever 205. This pin, by its action on the arm 209, serves to lock the two slides 151 and 153 together with a comparatively light pressure which is, however, sufficient in the operation of the machine on light uppers. In the modified construction shown, moreover, the stop 237 is so positioned that it is initially almost in contact with the abutment 235 on the arm 209, so that only a very slight rearward movement of the outer slide 153 is necessary to cause sufficient relief of the clamping pressure to permit relative movement of the two slides. The pin 331 and the stop 237 thus cooperate to establish the same virtual state of balance previously referred to in describing the construction shown in Fig. 8. When the stop 237 is moved upwardly out of the path of the abutment 235 near the end of the rearward movement of the cam slide 19, the plate 327 is moved out from under the plate 329 by the swinging of the bell-crank lever 239, 241, thus permitting the spring 229 to act in the same manner as in the construction shown in Fig. 8 to lock the slides 151 and 153 firmly together. In the return of the parts to starting positions in the second stage of the cycle of operations the plate 327 is returned to its initial position under the plate 329, the arm 221 being raised by the action of the arm 263 on the stud 269, and the pin 331 is again caused to act on the face 333 to lock the slides 151 and 153 lightly together. The outer slide 153 in its return movement stops short of the position which would be determined by engagement of its shoulders 279 (Fig. 10) with the bracket 75, the actual position of the slide being determined by engagement of the pin 331 with the face 333 on the arm 209. It will thus be seen that in the use of locking mechanisms constructed as shown in Fig. 13 no force in addition to that of the updraw springs 69 is applied to the upper through the springs 229.

It will be evident that by use of the mechanism shown in Fig. 5 in the manner hereinbefore described, and especially by movement of the hand lever 113 to one side or the other to increase the force of the pull of one side gripper on the upper and to decrease the force applied by the other side gripper, the operator may, if necessary, shift the forepart of the upper transversely of the last to adjust the throat opening relatively to the last. By reason, however, of the friction between the last and the upper it may not be easy for the operator thus to shift the upper without undesirably displacing the last. There is, accordingly, further provided means whereby the operator, after swinging the levers 113 and 99 upwardly as a unit to reduce substantially the force of the pull applied by both grippers to the upper, by further movement of these levers in the same direction may move the side grippers bodily heightwise of the last in upward directions against the tension of the springs 69, thus facilitating bodily movement of the forepart of the upper across the last by subsequent lateral movement of the hand lever 113. In the machine shown the arm 39 of each updraw lever 37 has associated with it a cradle member 351 (Figs. 3 and 4) which extends part way around the arm and connects the arm to an equalizing lever 353. These cradle members and the equalizing lever are similar to corresponding parts identified by the reference characters 48 and 36 respectively in United States Letters Patent No. 2,007,973, granted on July 16, 1935 on an application of B. Jorgensen's. The equalizing lever 353 has a stem portion 355 mounted to turn about an axis extending lengthwise of the shoe in a block 357. This block is secured to a rockshaft 359 extending widthwise of the machine and mounted in bearings in the frame. Secured to the left-hand portion of the rockshaft, which projects beyond the frame, is a lever 361 (Figs. 1 and 5) extending toward the rear of the machine. Freely mounted on the rockshaft adjacent to the lever 361 is a bell-crank lever having a rearwardly extending arm 363 and a forwardly and downwardly extending arm 365. The arm 363 is connected to a vertical plunger 367 of a fluid check or dashpot 369 with which machines of the type shown are customarily provided for retarding the upper-pulling movements of the side grippers.

The rear end portion of the lever 361 has thereon a horizontally extending abutment 371 which lies over and is arranged to engage the upper surface of the arm 363, the arm being held normally in engagement with the abutment by a strong spring 373 extending from the lever 361 to the arm 365. A portion 375 of the arm 365 has therein an arcuate guideway 377 concentric with the axis of the rockshaft 359. A block 379 slidably mounted in this guideway has a stem 381 extending outwardly therefrom through a bore in one arm 383 of a two-armed lever freely mounted on the rockshaft 359 adjacent to the lever 361. Threaded on the stem 381 is a nut 385 by which the arm 383 may be clamped to the arm 365 in the desired angular relation thereto. The second arm 387 of the two-armed lever extends downwardly somewhat at the rear of the arm 383. It will thus be seen that if the arm 387 is swung in a clockwise direction with reference to Fig. 5 it imparts movement in the same direction to the bell-crank lever 363, 365, and the arm 363 of this bell-crank lever, by engaging the abutment 371, turns the rockshaft 359 in the direction to cause the equalizing lever 353 to swing the side gripper updraw levers 37 against the resistance of the updraw springs 69.

For swinging the arm 387 in a clockwise direction as above described, a roll 389 (Figs. 5 and 7) is mounted on one arm 391 of a bell-crank lever which is mounted to swing about a pin 392 supported in a projection 393 on the lever 99 near the axis of the shaft 55. The other arm 394 of this bell-crank lever has threaded therein a stop screw 395 which is held in contact with the lever 99 by a spring 396. By means of the screw 395 the roll 389 may be adjusted forwardly or rearwardly. The roll is so positioned that after an appreciable amount of upward swinging movement of the lever 99, whereby the fulcrum rolls 49 are shifted to reduce the force of the pull of the side grippers on the upper, the roll 389 engages the arm 387 before the rolls 49 have reached their lower limits of movement along the levers 43. It will be evident that the actual time of contact of the roll 389 with the arm 387 is determined, not only by the setting of the screw 395, but also by the position of the arm 387 which, in turn, will vary in accordance with the amount of stretch that has occurred in the upper being operated upon. After engagement of the roll 389 with the arm 387, further upward swinging movement of the lever 99 causes the updraw levers 37 to move against the tension of the updraw springs as above described.

Having thus moved the side gripper updraw levers and thereby, it may be, completely relieved the force of the pull of the side grippers on the upper, the operator may swing the hand lever 113 to the right or the left, since neither of the fulcrum rolls 49 is at the lower limit of its movement along the corresponding lever 43. Such movement of the hand lever will increase the force applied by one of the springs 69 to the updraw lever 37 associated therewith and will decrease the force applied by the other spring to the other updraw lever. This will cause the updraw levers to move relatively to each other, as permitted by the equalizing lever 353, to shift the forepart of the upper bodily across the last. The full extent of this adjustment may not occur until the lever 99 has thereafter been somewhat depressed, since the grippers may have been moved upwardly by the lever 99 to such an extent that only slight further upward movement of one of them may take place before such movement is arrested by engagement of a portion of the gripper casing with an abutment on an adjacent portion of the frame. In that event, this gripper will remain stationary as the hand lever is depressed, while the other gripper moves downward until the full relative movement of the grippers has occurred. It will be understood that after the upper has thus been adjusted the lever 99 is moved downwardly by the operator to cause the side grippers again to pull the upper with the required force, and the hand lever 113 also may be moved laterally to vary relatively the forces applied to the upper by the opposite side grippers.

Thus far the action of the gripper-operating mechanism, including the coupling devices 41, has been described without reference to the effect of the dashpot 369. Such a dashpot, which may be constructed, for example, substantially as shown in United States Letters Patent No. 1,448,742, granted on March 20, 1923 on an application of J. Gouldbourn's, is used in machines of the type shown to retard the upper-pulling movements of the side grippers regardless of the comparatively rapid movement of the cam slide 19 and thus to prevent possible damage to the upper. Since the speed of movement of the updraw levers 37 is thus limited, the coupling devices 41 may be moved slightly in forward directions by the updraw springs 69 and thus move the pivot pins 26 of the levers 27 forwardly after the movement of the cam slide has stopped.

When the grippers release the upper early in the second stage of the cycle of operations and the coupling devices 41 are moved rapidly in forward directions to withdraw the grippers from the shoe heightwise thereof, there is a tendency for the levers 43, as they are swung about their fulcrum rolls 49, to cause the arms 53 on which the fulcrum rolls are mounted to swing upwardly. This has the advantage of increasing the effectiveness of the updraw springs 69 in quickly withdrawing the grippers. It results, however, in a downward displacement of the lever 99, despite the action of the pawl 121. Provision is therefore afforded, near the end of the second stage of the cycle, for returning the lever 99 to its initial position, if it has thus been displaced, and also for returning the hand lever 113 to its central position if it has been displaced laterally from that position by the operator. It will be understood that as the side grippers are being returned near the end of this stage of the cycle by forward movement of the cam slide 19, the updraw levers 37 act through the cradle members 351, the equalizing lever 353 and the rockshaft 359 to swing the lever 361 in a clockwise direction with reference to Fig. 5. This lever acts through the spring 373 to swing the bellcrank lever 363, 365, which is connected to the dashpot 369, in the same direction and thereby also to impart a clockwise movement to the arm 383. Because of the dashpot, this arm will move more slowly than the lever 361, its movement continuing under the action of the spring 373 after the lever has come to a stop until the arm 363 engages the abutment 371. The arm 383 by this movement is effective to return the levers 99 and 113 as above described by reason of engagement of a crossbar 401 on the arm with upwardly extending portions 403 of the previously mentioned levers 95 and 97 which are coupled respectively to the rods 105 and 107. It will be understood that by relative movement of the levers 95 and 97 the crossbar returns the hand lever 113 to its central position and by movement of both levers 95 and 97 in unison it returns the lever 99, the arm 383 being so adjusted relatively to the arm 365 as to bring the lever 99 to the required position. During this movement of the lever 99 the pawl 121 is held out of engagement with the arcuate member 127 in which the depressions 125 are formed by means which will presently be described. The control of the arm 383 by the dashpot insures against any objectionable shock of impact of the crossbar 401 on the levers 95 and 97.

The spring 124 which controls the pawl 121 is a comparatively light spring in order to facilitate the operation of the hand grip member 129. It has been found that unless the lever 99 is more securely held during an early portion of the first stage of the cycle of operations, the action of the levers 43 on the rolls 49 may move the lever 99 away from its initial position. In order to prevent this, there is provided other spring-controlled means for holding the lever more securely at this time and mechanism for rendering such other means inoperative near the end of the first stage of the cycle. Pivotally mounted on the lever 99 to swing about the same pin 123 as the pawl 121 is a two-armed lever 405 having an arm on which is a roll 406. Connected to the other arm of the lever 405 and to the lever 99 is a spring 407 which tends to swing the lever 405 in a clockwise direction with reference to Fig. 5 and thereby normally holds the roll against an arcuate member 408 fast on the frame, the center of curvature of this member being coincident with the axis of the shaft 55. Early in the first stage of the cycle of operations, while the gripper-operating mechanism is moving to apply a pull to the upper, the lever 99 occupies a position in which the roll 406 is in a notch 410 in the member 408, the force of the spring 407 being sufficient to cause the roll and the notch to prevent displacement of the lever at this time.

Machines of the type shown are each provided with a heel rest 397 (Fig. 1) which is moved in the first stage of the cycle of operations lengthwise of the shoe into engagement with its heel end. The means for thus moving the heel rest includes a cam slide 417 (Figs. 1 and 5) operated by a cam on the cam shaft 7, this cam slide corresponding to that shown at 10 in United States Letters Patent No. 1,029,387, granted on June 11, 1912 on an application of R. F. McFeely's. The heel rest is thus moved yieldingly by the cam slide through a spring 426 (Fig. 1) which corresponds to the spring shown at 14 in said Letters Patent. In the machine herein shown the downward movement of the cam slide 417 in thus applying the heel rest to the shoe is utilized to swing the lever 405 in a counterclockwise direction with reference to Fig. 5 and thereby to carry the roll 406 out of the notch 410 near the end of the first stage of the cycle, after which the lever 99 is controlled by the pawl 121, the pawl being moved into operative position just before the roll 406 is thus withdrawn from the notch 410, as will presently be described. That arm of the lever 405 which carries the roll 406 has a pin-and-slot connection 428 with one end of a rod 409 which is pivotally connected at its other end to one arm of a two-armed lever 411 pivotally mounted at 412 on the frame. The other arm of the lever 411 is pivotally connected to one end of a forwardly and upwardly extending rod 413 the other end of which is pivotally connected to one arm 415 of a bell-crank lever having another arm 419, the bell-crank lever being pivotally mounted on a stud 421 on a plate 423 fast on the frame adjacent to a bracket 424 in which the cam slide 417 is guided. This slide has thereon a shoulder 418 which, as the slide is moved downwardly to apply the heel rest to the shoe, engages the upper end of a screw 422 threaded in the arm 419 of the bell-crank lever and thereby swings the lever to withdraw the roll 406 from the notch 410.

The tail 143 of the pawl 121 is pivotally connected by a pin 402 with one end of a rod 404 the other end of which has a pin-and-slot connection 430 with a member 414 pivotally mounted on a pin 416 on the lower arm of the lever 411, the member 414 being held adjustably in fixed relation to this arm by two screws 420. Accordingly, as the bell-crank lever 415, 419 is moved in the manner above described, the spring 124 is permitted to swing the pawl 121 into engagement with the arcuate member 127, so that the pawl will enter one of the depressions 125 in this member, the pin-and-slot connections 428 and 430 being so arranged that the pawl is thus moved before the roll 406 is withdrawn from the notch 410. If the operator thereafter swings the lever 99 to vary the force of the pull on the upper between the first and second stages of the cycle of operations, the lever is retained by the pawl 121 in the position to which it is thus moved. When the heel rest is returned to its initial position in response to upward movement of the cam slide 417 in the second stage of the cycle, the spring 407 swings the lever 405 to carry the roll 406 again into engagement with the arcuate member 408, so that when the lever 99 is returned to its initial position by the arm 383 the roll 406 will again enter the notch 410, and the rod 404 is moved by the lever 411 in the direction to withdraw the pawl 121 from engagement with the arcuate member 127.

Figure 2:
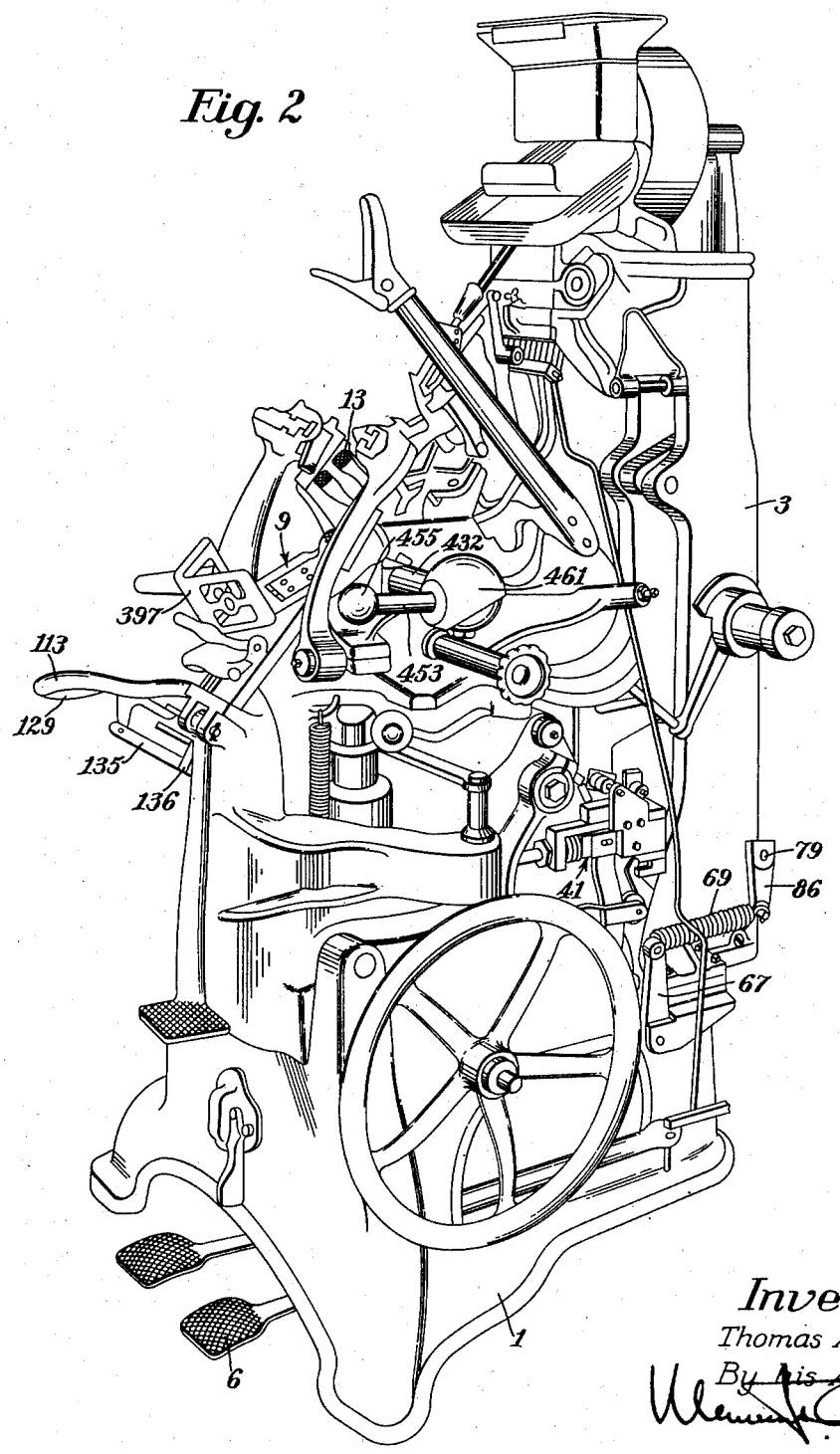
Fig. 2 is a perspective view of the machine, showing mechanism on the right-hand side thereof.

During the pause between the first and second stages of the cycle of operations it may be desired to move the side grippers lengthwise of the last in order to position the tip line at the proper distance from the end of the toe and in proper angular relation to the last. For this purpose the machine herein shown is provided with mechanism including a single hand lever by which the operator may move both side grippers together in the same direction lengthwise of the last, either forwardly or rearwardly, or may move them simultaneously in opposite directions either equal or unequal distances. By appropriate action of the hand lever also the operator may cause one gripper to remain stationary while the other is moved either forwardly or rearwardly. This mechanism is shown in Fig. 2 and in greater detail in Figs. 14, 15 and 16. Journaled in the frame of the machine is a transverse shaft 425 which corresponds to the shaft 259 of the machine shown in United States Letters Patent No. 663,777, granted on December 11, 1900 on an application of R. F. McFeely's. On the left-hand end of this shaft is a pinion 427 in engagement with teeth formed on a slide 429 which is coupled to the left-hand side gripper in substantially the same manner as the slide 250 shown in the last-mentioned Letters Patent. Mounted on the right-hand end portion of the shaft 425 and free to turn thereon is a sleeve 431 on the left-hand end of which is formed a pinion 433 in engagement with teeth on a slide 435 which is coupled to the right-hand side gripper in the same manner as the slide 429 to the left-hand side gripper. In the machine herein shown, as distinguished from the construction shown in the last-mentioned Letters Patent, the toothed portions of the slides 429 and 435 are both on the same side of the shaft 425 instead of on opposite sides thereof. Accordingly, rotation of the shaft 425 and the sleeve 431 in the same direction will cause the side grippers both to move together in the same direction lengthwise of the last.

The sleeve 431 is journaled in a sleeve-like portion 432 of the frame of the machine and has formed on its right-hand end a bevel gear 437. On the right-hand end of the shaft 425, which extends somewhat beyond the sleeve 431, is secured another bevel gear 439. In mesh with the two gears 437 and 439 is a third bevel gear 441, the shaft 425 and the sleeve 431 being thus connected together by differential gearing. The bevel gear 441 is freely rotatable on a stud 443 formed on a block 444 which is freely mounted on the shaft 425 between the bevel gears 437 and 439. The bevel gear 441 is secured in what may be termed a cradle which serves as a controller therefor and is formed by a partly spherical shell 445 on which is secured a plate 447 spanning an open portion of the shell, the plate being pivotally mounted on a stud 449 formed on the block 444 in alinement with the stud 443 at the opposite side of the shaft 425 from the bevel gear 441.

Extending forwardly from the above-mentioned cradle in perpendicular relation to the axis of the stud 443 is a rod 451. Slidingly mounted on this rod is a sleeve 453 having thereon a hand knob 455 at its outer end and a circular flange 457 at its inner end. This flange forms part of the surface of a sphere and is normally located in a corresponding circular opening 459 in a partly spherical member 461 which partially encloses the differential gearing and is secured to the right-hand end of the sleeve-like portion 432 of the frame. A portion of the shell 445 on the opposite side of the shaft 425 from the rod 451 is provided with a counterweight 463 for the rod and the sleeve 453.

When the flange 457 is located within the opening 459 the hand knob 455 is held stationary with the differential gearing so positioned that the opposite side grippers are at equal distances from the end of the toe of the shoe. The sleeve 453, however, may be retracted to remove its flange 457 from the opening 459 against the resistance of a spring 465 mounted between the head of a stud 467 in the end of the rod 451 and a shoulder 469 formed at the end of a recess in the knob 455. The rod 451 and the sleeve 453, which together serve as a hand lever, may then be swung in any direction with the shell 445 by the knob 455 on the sleeve to adjust the side grippers as desired lengthwise of the last. A purely upward movement of the knob causes all three bevel gears 437, 439 and 441 to turn as a unit about the axis of the shaft 425 and thus to move both side grippers equal distances toward the end of the toe, while a purely downward movement of the knob causes the grippers to move equally toward the heel end of the shoe. Movement of the knob horizontally in a direction widthwise of the machine causes the bevel gear 441 to rotate about the stud 443 and thus to rotate the bevel gears 437 and 439 in opposite directions respectively. The shaft 425 and the sleeve 431 are, therefore, rotated in opposite directions to move the side grippers respectively in opposite directions equal distances lengthwise of the last, the directions of the movements of the grippers depending upon whether the knob is moved toward the right or the left. In response to movement of the knob in a direction at 45° to the horizontal the bevel gear 441 will move bodily about the axis of the shaft 425 and will rotate simultaneously about its stud 443, and the resultant of these movements will cause one side gripper to move forwardly or rearwardly, depending upon whether the knob has a component of upward or downward movement, while the other side gripper remains stationary. Whichever gripper thus remains stationary will depend upon whether the knob has a component of movement toward the right or the left. It will be appreciated that by moving the knob in directions at other angles to the horizontal other variations may be made in the character of the movements imparted to the side grippers. For example, one gripper may be moved only a slight distance in one direction or the other while a greater movement in the same or in the opposite direction is imparted simultaneously to the other gripper.

After the heel rest 369 has been moved lengthwise of the shoe and pressed yieldingly against it through the spring 426 (Fig. 1) by downward movement of the cam slide 417, as hereinbefore described, it is locked against reverse movement away from the shoe as disclosed in the previously mentioned Letters Patent No. 1,029,387. In order to prevent undesirable lengthwise displacement of the shoe by the pressure of the heel rest thereon when the operator relieves the force of the pull of the side grippers on the upper and moves them to adjust the forepart of the upper widthwise of the last, the machine herein shown is additionally provided with means for locking the heel rest against further movement in a direction toward the toe end of the shoe after it has engaged the shoe. For this purpose a slide 501 (Fig. 5), which carries the heel rest and which corresponds to the slide 32 shown in the last-mentioned Letters Patent, has thereon a pin 503 extending into a slot 505 formed in one arm 507 of a lever which is pivotally mounted on a stud 509 on the previously mentioned plate 423. The other arm 511 of this lever consists of a segment with teeth 512 formed thereon and arranged to be engaged by a pair of staggered pawls 513, only one of which is visible in the drawings, these pawls being pivotally mounted on a pin 515 on the plate 423. The pawls are provided with tail portions 517 arranged to be engaged by a pin 519 extending widthwise of the machine from an arm 521 which extends forwardly from the previously mentioned lever arm 415. The pawls are controlled by springs 523 extending therefrom to the segment 511 and tending to swing them into engagement with the teeth 512. The arrangement is such that at the beginning of the cycle of operations of the machine, when the cam slide 417 is in its uppermost position, the spring 407 connected to the roll-carrying lever 405, in addition to its other functions, serves to hold the arm 521 in such a position that the pin 519 holds the pawls 513 out of engagement with the teeth 512. The heel rest is thus free to be moved into engagement with the shoe. When the cam slide 417 is moved downwardly to apply the heel rest to the shoe and acts near the end of its downward movement to swing the bell-crank lever 415, 419 in a counterclockwise direction with reference to Fig. 5, as hereinbefore described, the pin 419 is moved away from the tails of the pawls 513 to permit the springs 523 to swing them into engagement with the teeth 512, so that they will thereafter hold the heel rest against further movement in a direction toward the toe end of the shoe for the purpose described. When the cam slide is moved upwardly near the end of the second stage of the cycle of operations the pawls are withdrawn from engagement with the teeth by the action of the spring 407 to permit return movement of the heel rest.

The manner of operation of the mechanisms provided by the present invention having been fully explained in connection with the description of the mechanisms, no further description of the operation of the machine is necessary for an understanding of the invention.

It is to be understood that with respect to the means herein disclosed for operating each of the side grippers, including the lever 43 having the shiftable fulcrum and the connections between that lever and the gripper, the invention in some of its novel aspects is not limited as to the number of grippers thus operated or as to the location of any such gripper in relation to the shoe.

Having described the invention, what I claim as new and desire to secure by Letters Patent of the United States is:

1. In a machine for shaping uppers over lasts, grippers for pulling an upper respectively at the opposite sides of a last and for then holding it under tension, a member mounted for movements in different directions by the operator while the upper is thus held under tension by the grippers, and mechanism for altering simultaneously in the same sense the pulling forces of both said grippers on the upper in response to movement of said member in one direction and for increasing the force of the pull of one of said grippers and simultaneously decreasing the force of the pull of the other gripper in response to movement of said member in a different direction.

2. In a machine for shaping uppers over lasts, grippers for pulling an upper respectively at the opposite sides of a last and for then holding it under tension, a member mounted for movements in different directions by the operator while the upper is thus held under tension by the grippers, and mechanism for increasing or decreasing simultaneously the pulling forces of both said grippers on the upper in response to selected movements of said member and for increasing the force of the pull of either of said grippers and simultaneously decreasing the force of the pull of the other gripper in response to other movements of said member.

3. In a machine for shaping uppers over lasts, grippers for pulling an upper respectively at the opposite sides of a last and for then holding it under tension, two levers mounted for movement as a unit by the operator while the upper is thus held under tension by the grippers, one of said levers being arranged to operate the other and being further movable relatively to the other, and mechanism for altering simultaneously in the same sense the pulling forces of both said grippers on the upper in response to movement of both said levers as a unit and for increasing the force of the pull of one of said grippers and simultaneously decreasing the force of the pull of the other gripper in response to movement of said one lever only.

4. In a machine for shaping uppers over lasts, grippers for pulling an upper respectively at the opposite sides of a last and for then holding it under tension, two levers mounted for movements as a unit by the operator while the upper is thus held under tension by the grippers, one of said levers being arranged to operate the other and being further movable relatively to the other, and mechanism for increasing or decreasing simultaneously the pulling forces of both said grippers on the upper in response to selected movements of both levers as a unit and for increasing the force of the pull of either of said grippers and simultaneously decreasing the force of the pull of the other gripper in response to movements of said one lever only.

5. In a machine for shaping uppers over lasts, grippers for pulling an upper respectively at the opposite sides of a last and for then holding it under tension, a lever mounted for swinging movement, another lever mounted on said first-named lever to swing therewith or relatively thereto, said levers being both movable as a unit by force applied by the operator to said other lever while the upper is held under tension by the grippers, and mechanism for altering simultaneously in the same sense the pulling forces of both said grippers on the upper in response to movement of both said levers as a unit and for increasing the force of the pull of one of said grippers and simultaneously decreasing the force of the pull of the other gripper in response to movement of said other lever only.

6. In a machine for shaping uppers over lasts, grippers for pulling an upper respectively at the opposite sides of a last and for then holding it under tension, a lever mounted for swinging movements about an axis, another lever pivotally mounted on said first-named lever to swing about an axis at right angles to said first axis, said levers being both movable as a unit by force applied by the operator to said other lever while the upper is held under tension by the grippers, and mechanism for increasing or decreasing simultaneously the pulling forces of both said grippers on the upper in response to movements of both said levers as a unit about said first-named axis and for increasing the force of the pull of either of said grippers and simultaneously decreasing the force of the pull of the other gripper in response to movements of said other lever about its axis on the first-named lever.

7. In a machine for shaping uppers over lasts, grippers for pulling an upper respectively at the opposite sides of a last in a cycle of power operations of the machine and for then holding it under tension, a lever mounted for swinging movement, another lever mounted on said first-named lever to swing therewith or relatively thereto, said levers being movable by the operator while the upper is held under tension by the grippers, mechanism for increasing the pulling forces of both said grippers on the upper in response to movement of both said levers as a unit and for increasing the force of the pull of either of said grippers and simultaneously decreasing the force of the pull of the other gripper in response to movements of said other lever only, and automatic means for returning both said levers to initial positions prior to the completion of the cycle of operations.

8. In a machine for shaping uppers over lasts, grippers for pulling an upper respectively at the opposite sides of a last in a cycle of power operations of the machine and for then holding it under tension, mechanism movable to operate the grippers, means for imparting return movement to said gripper-operating mechanism prior to the completion of the cycle of operations, a lever mounted for swinging movement, another lever mounted on said first-named lever to swing therewith or relatively thereto, said levers being movable by the operator while the upper is held under tension by the grippers, mechanism for increasing the pulling forces of both said grippers on the upper in response to movement of both said levers as a unit and for increasing the force of the pull of either of said grippers and simultaneously decreasing the force of the pull of the other gripper in response to movements of said other lever only, and automatic means for returning said levers to initial positions by the return movement of said gripper-operating mechanism.

9. In a machine for shaping uppers over lasts, grippers for pulling an upper respectively at the opposite sides of a last, springs associated respectively with said different grippers for holding the upper yieldingly under tension after it has thus been pulled, a member mounted for movements in different directions by the operator while the upper is thus held under tension, and mechanism for increasing or decreasing simultaneously the pulling forces of both said grippers on the upper by varying the effectiveness of said springs in response to selected movements of said member and for increasing the force of the pull of either of said grippers and simultaneously decreasing the force of the pull of the other gripper by further varying the effectiveness of said springs in response to other movements of said member.

10. In a machine for shaping uppers over lasts, grippers for pulling an upper respectively at the opposite sides of a last, springs associated respectively with said different grippers for holding the upper yieldingly under tension after it has thus been pulled, a lever mounted for swinging movements, another lever mounted on said first-named lever to swing therewith or relatively thereto, said levers being movable by the operator while the upper is held under tension by the grippers, and mechanism for increasing or decreasing simultaneously the pulling forces of both said grippers on the upper by varying the effectiveness of said springs in response to movements of both said levers as a unit and for increasing the force of the pull of either of said grippers and simultaneously decreasing the force of the pull of the other gripper by further varying the effectiveness of said springs in response to movements of said other lever only.

11. In a machine for shaping uppers over lasts, grippers for pulling an upper respectively at the opposite sides of a last, springs associated respectively with said different grippers for holding the upper yieldingly under tension after it has thus been pulled, a member movable in different directions by the operator while the upper is thus held under tension, and mechanism for decreasing the force of the pull of said grippers on the upper by control of said springs in response to movement of said member in one direction and for adjusting the upper widthwise of the last through the grippers by further control of said springs in response to movement of said member in a different direction.

12. In a machine for shaping uppers over lasts, grippers for pulling an upper respectively at the opposite sides of a last and for then holding it under tension, levers arranged to act respectively on said different grippers in the pulling of the upper, and means for varying simultaneously the pulling forces of both said grippers on the upper while it is held under tension by varying the mechanical advantage of said levers.

13. In a machine for shaping uppers over lasts, grippers for pulling an upper respectively at the opposite sides of a last and for then holding it under tension, levers arranged to act respectively on said different grippers in the pulling of the upper, and means for increasing the force of the pull of either of said grippers on the upper while it is held under tension and for simultaneously decreasing the force of the pull of the other gripper by varying the mechanical advantage of said levers.

14. In a machine for shaping uppers over lasts, grippers for pulling an upper respectively at the opposite sides of a last, levers arranged to act respectively on said different grippers in the pulling of the upper, spring means associated with said levers for holding the upper yieldingly under tension after it has thus been pulled, a member movable by the operator while the upper is thus held under tension, and mechanism movable by said member to increase or decrease simultaneously the pulling forces of both said grippers on the upper by varying the mechanical advantage of said levers.

15. In a machine for shaping uppers over lasts, grippers for pulling an upper respectively at the opposite sides of a last, levers arranged to act respectively on said different grippers in the pulling of the upper, spring means associated with said levers for holding the upper yieldingly under tension after it has thus been pulled, a member mounted for movements in different directions by the operator while the upper is thus held under tension, and mechanism controlled by said member for varying the mechanical advantage of said levers and for thereby increasing or decreasing simultaneously the pulling forces of both said grippers on the upper by selected movements of said member and for increasing the force of the pull of either of said grippers and simultaneously decreasing the force of the pull of the other gripper by other movements of said member.

16. In a machine for shaping uppers over lasts, grippers for pulling an upper respectively at the opposite sides of a last, levers arranged to act respectively on said different grippers in the pulling of the upper, a member movable by the operator, and means movable by said member to increase the mechanical advantage of either of said levers and simultaneously to decrease the mechanical advantage of the other lever.

17. In a machine for shaping uppers over lasts, grippers for pulling an upper respectively at the opposite sides of a last, levers arranged to act respectively on said different grippers in the pulling of the upper, a member movable in different directions by the operator, and mechanism for increasing or decreasing simultaneously the mechanical advantage of both said levers by selected movements of said member and for increasing the mechanical advantage of either of the levers and simultaneously decreasing the mechanical advantage of the other lever by other movements of said member.

18. In a machine for shaping uppers over lasts, grippers for pulling an upper respectively at the opposite sides of a last and for then holding it under tension, levers arranged to act respectively on said different grippers in the pulling of the upper, means providing fulcrums for said levers, and means for varying simultaneously the pulling forces of both said grippers on the upper while it is held under tension by varying the positions of said fulcrums lengthwise of the levers.

19. In a machine for shaping uppers over lasts, grippers for pulling an upper respectively at the opposite sides of a last and for then holding it under tension, levers arranged to act respectively on said different grippers in the pulling of the upper, means providing fulcrums for said levers, and means for increasing the force of the pull of either of said grippers on the upper while it is held under tension and for simultaneously decreasing the force of the pull of the other gripper by varying the positions of said fulcrums relatively to the levers.

20. In a machine for shaping uppers over lasts, grippers for pulling an upper respectively at the opposite sides of a last, levers arranged to act respectively on said different grippers in the pulling of the upper, spring means associated with said levers for holding the upper yieldingly under tension after it has thus been pulled, means providing movable fulcrums for said levers, a member movable by the operator while the upper is thus held under tension, and means controlled by said member for varying the pulling forces of both said grippers on the upper by moving said fulcrums lengthwise of the respective levers.

21. In a machine for shaping uppers over lasts, grippers for pulling an upper respectively at the opposite sides of a last, levers arranged to act respectively on said different grippers in the pulling of the upper, spring means associated with said levers for holding the upper yieldingly under tension after it has thus been pulled, means providing movable fulcrums for said levers, a member mounted for movements in different directions by the operator while the upper is thus held under tension, and mechanism for moving said fulcrums lengthwise of the respective levers to increase or decrease simultaneously the pulling forces of both said grippers on the upper in response to selected movements of said member and to increase the force of the pull of either of said grippers and simultaneously decrease the force of the pull of the other gripper in response to other movements of said member.

22. In a machine for shaping uppers over lasts, grippers for pulling an upper respectively at the opposite sides of a last, levers arranged to act respectively on said different grippers in the pulling of the upper, means providing movable fulcrums for said levers, a member movable by the operator, and means controlled by said member for moving said fulcrums lengthwise of the respective levers to increase the mechanical advantage of one of the levers and simultaneously to decrease the mechanical advantage of the other lever.

23. In a machine for shaping uppers over lasts, grippers for pulling an upper respectively at the opposite sides of a last, levers arranged to act respectively on said different grippers in the pulling of the upper, means providing movable fulcrums for said levers, a member movable by the operator, and means controlled by said member for moving said fulcrums lengthwise of the respective levers to increase or decrease simultaneously the mechanical advantage of both levers or for moving them in directions to increase the mechanical advantage of either lever and simultaneously to decrease the mechanical advantage of the other lever.

24. In a machine for shaping uppers over lasts, grippers for pulling an upper respectively at the opposite sides of a last, springs associated respectively with said different grippers for holding the upper yieldingly under tension after it has thus been pulled, a member movable by the operator while the upper is thus held under tension, mechanism for decreasing the force of the pull of said grippers on the upper by control of said springs in response to movement of said member in one direction, and additional mechanism for moving the grippers against the resistance of said springs further to decrease the force of their pull on the upper by further movement of said member in the same direction.

25. In a machine for shaping uppers over lasts, grippers for pulling an upper respectively at the opposite sides of a last, springs associated respectively with said different grippers for holding the upper yieldingly under tension after it has thus been pulled, a member movable in different directions by the operator while the upper is thus held under tension, mechanism for decreasing the force of the pull of said grippers on the upper by control of said springs in response to movement of said member in one direction and for adjusting the upper widthwise of the last through the grippers by further control of said springs in response to movement of said member in a different direction, and additional mechanism for moving the grippers against the resistance of said springs further to decrease the force of their pull on the upper by additional movement of said member in said first-named direction prior to such adjustment of the upper.

26. In a machine for shaping uppers over lasts, a gripper for gripping an upper on a last, means for operating said gripper to pull the upper, a lever arranged to be swung by said operating means in response to resistance of the upper to the force of the pull of the gripper thereon, a spring for yieldingly resisting the swinging of said lever, and means for increasing or decreasing the force of the pull of the gripper on the upper by varying the mechanical advantage of said lever.

27. In a machine for shaping uppers over lasts, a gripper for gripping an upper on a last, means for operating said gripper to pull the upper, a lever arranged to be swung by said operating means in response to resistance of the upper to the force of the pull of the gripper thereon, a spring for yieldingly resisting the swinging of said lever, means providing a fulcrum for the lever, and means for increasing or decreasing the force of the pull of the gripper on the upper by varying the position of said fulcrum lengthwise of the lever.

28. In a machine for shaping uppers over lasts, a gripper for gripping an upper on a last and for pulling the upper, a lever arranged to act on said gripper in the pulling of the upper, a spring arranged to act on said lever to cause the gripper to hold the upper yieldingly under tension after it has been pulled, and means for varying the force of the pull of the gripper on the upper while the upper is thus held under tension by varying the mechanical advantage of said lever.

29. In a machine for shaping uppers over lasts, a gripper for gripping an upper on a last and for pulling the upper, a lever, means providing a fulcrum for said lever between its opposite ends, connections between one arm of the lever and the gripper, a spring arranged to act on the other arm of the lever to cause the gripper to hold the upper under tension after it has been pulled, and means for varying the force of the pull of the gripper on the upper while it is thus held under tension by varying relatively the effective lengths of the two arms of the lever.

30. In a machine for shaping uppers over lasts, a gripper for gripping an upper on a last and for pulling the upper, a lever for operating said gripper to pull the upper, a fulcrum for said lever movable in response to resistance of the upper to the force of the pull thereon, another lever, means for moving said other lever by the movement of said fulcrum, a spring for yieldingly resisting the movement of said other lever, and means for increasing or decreasing the force of the pull of the gripper on the upper by varying the mechanical advantage of said other lever.

31. In a machine for shaping uppers over lasts, a gripper for gripping an upper on a last and for pulling the upper, a lever for operating said gripper to pull the upper, a fulcrum for said lever movable in response to resistance of the upper to the force of the pull thereon, another lever, means for moving said other lever by the movement of said fulcrum, a spring for yieldingly resisting the movement of said other lever, a fulcrum for said other lever, and means for increasing or decreasing the force of the pull of the gripper on the upper by varying the position of said last-named fulcrum lengthwise of said other lever.

32. In a machine for shaping uppers over lasts, a gripper for gripping an upper on a last and for pulling the upper, a lever for operating said gripper to pull the upper, a fulcrum for said lever movable in response to resistance of the upper to the force of the pull thereon, another lever, means arranged to act on one end of said other lever to move said other lever by the movement of said fulcrum, a spring arranged to act on the other end of said other lever yieldingly to oppose its movement, and a fulcrum for said other lever between its opposite ends, said fulcrum being movable to vary the mechanical advantage of said other lever and thus to increase or decrease the force of the pull of the gripper on the upper.

33. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of members movable one by the other to swing the lever against the resistance of said spring in the upper-pulling operation, means for locking said pair of members together to render one thus effective on the other, and automatic means for momentarily unlocking said pair of members a plurality of times in the upper-pulling operation to permit relative movements thereof and thus to reduce the amount of movement imparted to said lever.

34. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of slides movable one by the other to swing the lever against the resistance of said spring in the upper-pulling operation, frictional means for locking said slides together to render one thus effective on the other, and automatic means for momentarily reducing the friction of said locking means a plurality of times in the upper-pulling operation to permit relative movements of said slides and thus to reduce the amount of movement imparted to said lever.

35. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of members movable one by the other to swing the lever against the resistance of said spring in the upper-pulling operation, means for locking said pair of members together to render one thus effective on the other, and means responsive to the movements of said pair of members for momentarily unlocking them a plurality of times in the upper-pulling operation to permit relative movements thereof and thus to reduce the amount of movement imparted to said lever.

36. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of members movable one by the other to swing the lever against the resistance of said spring in the upper-pulling operation, spring-operated means movable with said pair of members for locking them together to render one thus effective on the other, and a device in the path of movement of said locking means for momentarily unlocking said pair of members a plurality of times in the upper-pulling operation to permit relative movements thereof and thus to reduce the amount of movement imparted to said lever.

37. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of members movable one by the other to swing the lever against the resistance of said spring in the upper-pulling operation, frictional locking means movable with said pair of members and including a spring-controlled device for holding said members locked together to render one thus effective on the other, and an abutment in the path of movement of said device for momentarily unlocking said pair of members a plurality of times in the upper-pulling operation to permit relative movements thereof and thus to reduce the amount of movement imparted to said lever.

38. In a machine for shaping uppers over lasts, a gripper for gripping an upper on a last and for pulling the upper, a member movable to operate said gripper, a lever arranged to be moved by said member in response to resistance of the upper to the force of the pull thereon, a spring for yieldingly opposing the movement of said lever and for holding the upper under tension, means connecting said operating member to the lever comprising a pair of members movable one by the other to swing the lever against the resistance of said spring in the upper-pulling operation, means movable with said pair of members for locking them together to render one thus effective on the other, an abutment in the path of movement of said locking means for momentarily unlocking said pair of members a plurality of times in the upper-pulling operation to permit relative movements thereof and thus to reduce the amount of movement imparted to said lever, and means for withdrawing said abutment from the path of the locking means prior to the completion of the upper-pulling operation to cause said members to be locked together at the end of the pull.

39. In a machine for shaping uppers over lasts, a gripper for gripping an upper on a last and for pulling the upper, a lever for operating said gripper to pull the upper, a fulcrum for said lever movable in response to resistance of the upper to the force of the pull thereon, another lever arranged to be moved by the movement of said fulcrum, a spring for yieldingly opposing the movement of said other lever, means connecting said fulcrum to said other lever comprising a pair of members movable one by the other to swing the other lever against the resistance of said spring in the upper-pulling operation, means for locking said pair of members together to render one thus effective on the other, and automatic means for momentarily unlocking said pair of members a plurality of times in the upper-pulling operation to permit relative movements thereof and thus to reduce the amount of movement imparted to said other lever.

40. In a machine for shaping uppers over lasts, grippers for pulling an upper respectively at the opposite sides of a last, a member mounted for movements in different directions by the operator, and connections between said member and the grippers for moving both grippers simultaneously in the same direction lengthwise of the last by movement of said member in one direction and for moving them simultaneously in opposite directions respectively lengthwise of the last by movement of said member in another direction.

41. In a machine for shaping uppers over lasts, grippers for pulling an upper respectively at the opposite sides of a last, a member mounted for movements in different directions by the operator, and connections between said member and the grippers for moving both grippers simultaneously lengthwise of the last toward its toe end or its heel end by movement of said member in one direction or the opposite direction and for moving either of said grippers lengthwise of the last toward the toe end and simultaneously moving the other gripper toward the heel end by other selected movements of said member.

42. In a machine for shaping uppers over lasts, grippers for pulling an upper respectively at the opposite sides of a last, a member mounted for movements in different directions by the operator, and connections between said member and the grippers for moving both grippers simultaneously in the same direction lengthwise of the last by movement of said member in one direction and for moving either of them lengthwise of the last while the other is substantially stationary by other selected movements of said member.

43. In a machine for shaping uppers over lasts, grippers for pulling an upper respectively at the opposite sides of a last, a member mounted for movements in different directions by the operator, and connections between said member and the grippers for moving both grippers simultaneously equal distances in the same direction lengthwise of the last by movement of said member in one direction and for similarly moving them simultaneously in the same direction but different distances respectively by movement of said member in another direction.

44. In a machine for shaping uppers over lasts, grippers for pulling an upper respectively at the opposite sides of a last, a member mounted for movements in different directions by the operator, and connections between said member and the grippers for moving both grippers simultaneously equal distances lengthwise of the last in opposite directions respectively by movement of said member in one direction and for similarly moving them simultaneously in opposite directions but different distances respectively by movement of said member in another direction.

45. In a machine for shaping uppers over lasts, grippers for pulling an upper respectively at the opposite sides of a last, a hand lever movable by the operator directly upward or downward, directly to the left or right or in inclined directions, and mechanism for imparting to said grippers by said lever movements lengthwise of the last differing in accordance with the direction in which said lever is thus moved.

46. In a machine for shaping uppers over lasts, grippers for pulling an upper respectively at the opposite sides of a last, differential gearing, means movable by the operator to impart to said gearing different movements selectively, and means connecting said gearing to the grippers for imparting to the grippers movements lengthwise of the last differing in accordance with such differences in the movement of the gearing.

47. In a machine for shaping uppers over lasts, grippers for pulling an upper respectively at the opposite sides of a last, a lever mounted for universal swinging movement by the operator, and differential gearing connected to said grippers and movable by said lever for imparting to the grippers movements lengthwise of the last differing in accordance with the direction in which the lever is thus moved.

48. In a machine for shaping uppers over lasts, grippers for pulling an upper respectively at the opposite sides of a last, a member mounted for movements in different directions by the operator, and mechanism including differential gearing connecting said member to the grippers for moving both grippers simultaneously in the same direction lengthwise of the last by movement of said member in one direction and for moving them simultaneously in opposite directions lengthwise of the last by movement of said member in another direction.

49. In a machine for shaping uppers over lasts, grippers for pulling an upper respectively at the opposite sides of a last, a member mounted for movements in different directions by the operator, and mechanism including differential gearing connecting said member to the grippers for moving both grippers simultaneously in the same direction lengthwise of the last by movement of said member in one direction and for moving either of them lengthwise of the last while the other is substantially stationary by other selected movements of said member.

50. In a machine for shaping uppers over lasts, grippers for pulling an upper respectively at the opposite sides of a last, a pair of members rotatable about a common axis and connected respectively to said different grippers for moving them lengthwise of the last, bevel gears rotatable respectively with said different members, a third bevel gear connecting said first-named gears together, a controller for said third gear rotatable about said common axis to move the third gear bodily about said axis and thus to turn both said rotatable members in the same direction, said controller being also rotatable with said third gear about an axis at right angles to said common axis to cause the third gear to turn said rotatable members respectively in opposite directions, and means movable by the operator to impart such different movements to said controller and thus to move said grippers simultaneously lengthwise of the last either in the same direction or in opposite directions.

51. In a machine for shaping uppers over lasts, grippers for pulling an upper respectively at the opposite sides of a last, a pair of members rotatable about a common horizontal axis, rack bars connecting the grippers respectively to said different members at the same side of said axis, bevel gears rotatable respectively with said different members, a third bevel gear connecting said first-named bevel gears together, a controller for said third gear rotatable about said common axis to move the third gear bodily about said axis and thus to move both grippers simultaneously in the same direction lengthwise of the last, and a hand lever extending from said controller and movable upwardly or downwardly thus to operate the controller, said controller being also rotatable with said third gear about an axis at right angles to said common axis in response to movement of the hand lever to the right or the left to move both grippers simultaneously in opposite directions lengthwise of the last.

52. In a machine for shaping uppers over lasts, grippers for pulling an upper respectively at the opposite sides of a last, a pair of members rotatable about a common axis and connected respectively to said different grippers for moving them lengthwise of the last, bevel gears rotatable respectively with said different members, a third bevel gear connecting said first-named gears together, a controller for said third gear mounted for universal movement to carry the third gear bodily about said axis and thus to turn both said rotatable members in the same direction and also to turn the third gear about its own axis and thus to turn said members respectively in opposite directions, and a hand lever extending from said controller and universally movable with it to impart to the grippers through said gears movement lengthwise of the last differing in accordance with differences in the direction of the movement of the hand lever.

53. In a machine for shaping uppers over lasts, grippers for pulling an upper respectively at the opposite sides of a last, a pair of members rotatable about a common axis and connected respectively to said different grippers for moving them lengthwise of the last, bevel gears rotatable respectively with said different members, a third bevel gear connecting said first-named gears together, a controller for said third gear mounted for universal movement to carry the third gear bodily about said axis and also to turn it about its own axis, a hand lever extending from said controller and universally movable with it to impart to the grippers through said gears movements lengthwise of the last differing in accordance with differences in the direction of the movement of the hand lever, and means for locking said hand lever in the same position prior to the operation of the machine on each upper to maintain the grippers in predetermined initial positions with respect to movement lengthwise of the last.

THOMAS AUBREY KESTELL.

REFERENCES CITED

The following references are of record in the file of this patent:

UNITED STATES PATENTS

| Number | Name | Date |
|---|---|---|
| 274,207 | Matzeliger | Mar. 20, 1883 |
| 628,200 | Keats et al. | July 4, 1899 |
| 818,766 | Keats | Apr. 24, 1906 |
| 1,017,736 | Brothers | Feb. 20, 1912 |
| 1,024,504 | Galloway | Apr. 30, 1912 |
| 1,169,872 | Russell | Feb. 1, 1916 |
| 1,280,613 | Ashton | Oct. 1, 1918 |
| 1,293,162 | Mills et al. | Feb. 4, 1919 |
| 1,324,268 | Perri | Dec. 9, 1919 |
| 1,799,996 | Wollny | Apr. 7, 1931 |